United States Patent [19]
Lemelson et al.

[11] Patent Number: 6,084,510
[45] Date of Patent: Jul. 4, 2000

[54] DANGER WARNING AND EMERGENCY RESPONSE SYSTEM AND METHOD

[76] Inventors: Jerome H. Lemelson, 930 Tahoe Blvd., Unit 802, Suite #286, Incline Village, Nev. 89451-9436; Robert D. Pedersen, 7808 Glenneagle, Dallas, Tex. 75248

[21] Appl. No.: 08/844,029

[22] Filed: Apr. 18, 1997

[51] Int. Cl.⁷ .............................. G08B 1/08; H04N 7/18
[52] U.S. Cl. .................. 340/539; 340/905; 340/990; 342/357; 342/451; 342/457; 348/135; 348/143; 348/144; 348/149; 382/103; 382/104; 701/200; 701/209; 701/210
[58] Field of Search .............................. 340/539, 905, 340/990, 517, 518, 601; 342/26, 27, 46, 352, 357, 362, 367, 385, 450, 451, 457; 348/135, 143, 144, 148, 149; 382/103, 104; 701/200, 207, 208, 209, 210

[56] References Cited

U.S. PATENT DOCUMENTS

| | | | |
|---|---|---|---|
| 4,611,209 | 9/1986 | Lemelson et al. | 343/455 |
| 4,622,544 | 11/1986 | Bially et al. | 340/636 |

(List continued on next page.)

OTHER PUBLICATIONS

"Timely Warning", *Popular Science*, by Stuart Brown, p. 96 Apr. 1997.

Leick, Alfred, *GPS Satellite Surveying*, John Wiley & Sons, pp. 58–92, New York, Jan. 1990.

Logsdon, Tom, *The Navstar Global Positioning System*, Van Nostrand Reinhold, pp. 17–33, New York Jan. 1992.

McNeil, Daniel, *Fuzzy Logic*, Simon & Schuster, pp. 101–126, New York Jan. 1993.

Mendel, Jerry M., "Fuzzy Logic Systems for Engineering: A Tutorial," *Proceedings of the IEEE*, vol. 83, No. 3, pp. 345–377, Mar. 1995.

Schwartz, Klir, "Fuzzy Logic Flowers in Japan," *IEEE Spectrum*, pp. 32–35, Jul. 1992.

Bezdek, Jim, "Editorial: Fuzzy Model—What Are They, and Why?," *Applications of Fuzzy Logic Technology*, SPIE No. 2061m Boston, Mass., Sep. 8–10, 1993.

Brubaker, David, "Fuzzy Operators," *EDN*, pp. 239–241, Nov. 9, 1995., Oct., 1992.

Cox, Earl, "Fuzzy Fundamentals," *IEEE Spectrum*, pp. 76–81, Oct. 1992.

(List continued on next page.)

*Primary Examiner*—Donnie L. Crosland
*Attorney, Agent, or Firm*—Steven G. Lisa

[57] ABSTRACT

Surveillance platforms in airborne craft (8,10), land based vehicles (12), vessels at sea or fixed structures (14) detect dangers using conventional scanners and transmit information signals describing the dangers to a control center (2) which analyzes the data and determines the degree of danger and its geographic extent. The center generates a danger warning and emergency response including a danger index. The warning/response message identifies the degree of danger (danger index 144) and the GPS coordinates (142) of the impacted geographic area for a wide region or regions of the earth (FIGS. 2–6). A vulnerability index (FIG. 16) determined using neural networks (FIGS. 13–14) and fuzzy logic (FIGS. 15–20) enables a prioritized warning/response. The center broadcasts (18) the danger warning and emergency response (FIG. 9) to a large population of remotely located warning devices (11), such as a network of pagers each of which has a GPS receiver (6,28). The pagers compare the received danger coordinates with their own GPS coordinates and each pager determines the extent to which it is in danger. The warning device automatically issues a warning signal or signals, which may be audible, visual or vibratory, appropriate to the degree of danger. Emergency manned vehicles may also directly receive the broadcast warning/response and be immediately alerted to act appropriately relative to the degree of danger. One embodiment broadcasts (16) directly to home T.V.'s and radios (17) which have internal GPS receivers and which display/annunciate an emergency message customized to that receiver resulting from the internal comparison of the danger coordinates versus the local receiver coordinates.

172 Claims, 18 Drawing Sheets

U.S. PATENT DOCUMENTS

| | | | |
|---|---|---|---|
| 4,814,711 | 3/1989 | Olsen et al. | 342/357 |
| 4,856,047 | 8/1989 | Saunders | 379/57 |
| 4,887,291 | 12/1989 | Stillwell | 379/39 |
| 4,956,857 | 9/1990 | Kurosaki | 378/110 |
| 4,993,059 | 2/1991 | Smith et al. | 379/39 |
| 5,119,102 | 6/1992 | Barnard | 342/357 |
| 5,119,504 | 6/1992 | Durboraw, III | 455/54.1 |
| 5,182,566 | 1/1993 | Ferguson et al. | 342/357 |
| 5,187,805 | 2/1993 | Bertiger et al. | 455/12.1 |
| 5,202,829 | 4/1993 | Geier | 364/449 |
| 5,223,844 | 6/1993 | Mansell et al. | 342/357 |
| 5,225,842 | 7/1993 | Brown et al. | 342/357 |
| 5,243,652 | 9/1993 | Teare et al. | 380/21 |
| 5,247,440 | 9/1993 | Capurka et al. | 364/424.05 |
| 5,248,979 | 9/1993 | Orme et al. | 342/352 |
| 5,278,539 | 1/1994 | Lauterbach et al. | 340/539 |
| 5,311,197 | 5/1994 | Sorden et al. | 342/457 |
| 5,323,322 | 6/1994 | Mueller et al. | 364/449 |
| 5,334,974 | 8/1994 | Simms et al. | 340/990 |
| 5,345,244 | 9/1994 | Gildea et al. | 342/357 |
| 5,359,332 | 10/1994 | Allison et al. | 342/357 |
| 5,379,224 | 1/1995 | Brown et al. | 364/449 |
| 5,379,337 | 1/1995 | Castillo et al. | 379/45 |
| 5,382,958 | 1/1995 | FitzGerald | 342/386 |
| 5,389,934 | 2/1995 | Kass | 342/357 |
| 5,390,125 | 2/1995 | Sennott et al. | 364/449 |
| 5,396,540 | 3/1995 | Gooch | 379/59 |
| 5,408,238 | 4/1995 | Smith | 342/357 |
| 5,414,432 | 5/1995 | Penny, Jr. et al. | 342/357 |
| 5,415,167 | 5/1995 | Wilk | 128/653.1 |
| 5,418,537 | 5/1995 | Bird | 342/357 |
| 5,422,813 | 6/1995 | Schuchman et al. | 364/449 |
| 5,422,816 | 6/1995 | Sprague et al. | 364/449 |
| 5,430,656 | 7/1995 | Dekel et al. | 364/449 |
| 5,434,787 | 7/1995 | Okamoto et al. | 364/449 |
| 5,438,337 | 8/1995 | Aguado | 342/357 |
| 5,576,952 | 11/1996 | Stutman et al. | 364/413.02 |
| 5,636,245 | 6/1997 | Ernst et al. | 375/259 |
| 5,652,570 | 7/1997 | Lepkofker | 340/573 |
| 5,705,980 | 1/1998 | Shapiro | 340/539 |
| 5,712,619 | 1/1998 | Simkin | 340/539 |
| 5,731,757 | 3/1998 | Layson, Jr. | 340/573 |
| 5,731,785 | 3/1998 | Lemelson et al. | 342/457 |
| 5,742,233 | 4/1998 | Hoffman et al. | 340/573 |

OTHER PUBLICATIONS

Gottwald, Siegfried, *Fuzzy Sets and Fuzzy Logic: The Foundations of Application—from a Mathematical Point of View*, pp. 133–168, Jan. 1993.

Hurn, Jeff, *GPS—A Guide to the Next Utility*, Trimble Navigation, Ltd., pp. 7–12, Jan. 1989.

Hurn, Jeff, *Differential GPS Explained*, Trimble Navigation, Ltd., pp. 7–12, Jan. 1993.

Jang, and Chuen–Tsai, "Neuro–Fuzzy Modeling and Control," *Proceedings of the IEEE*, vol. 83, No. 3, pp. 378–406, Mar. 1995.

Kosko, and Isaka, "Fuzzy Logic," *Scientific American*, pp. 76–81, Jul. 1993.

COUNTRY MAP ZONES

V/D=
VULNERABILITY/
DISTANCE

OUTPUT=
DANGER
INDEX

RELATIVE VELOCITY = LOW

| V/D | VC | C | M | F | VF |
|-----|----|----|----|----|----|
| VL | M | L | VL | VL | VL |
| L | H | M | L | VL | VL |
| N | VH | H | M | L | VL |
| H | VH | H | M | M | L |
| VH | VH | VH | H | M | L |

RELATIVE VELOCITY = MODERATE

| V/D | VC | C | M | F | VF |
|-----|----|----|----|----|----|
| VL | H | M | L | VL | VL |
| L | H | H | M | L | VL |
| N | VH | H | M | M | L |
| H | VH | VH | H | M | M |
| VH | VH | VH | H | H | M |

RELATIVE VELOCITY = HIGH

| V/D | VC | C | M | F | VF |
|-----|----|----|----|----|----|
| VL | H | H | M | L | VL |
| L | VH | H | M | M | L |
| N | VH | H | H | M | M |
| H | VH | VH | H | H | M |
| VH | VH | VH | VH | H | H |

FIG. 16

$$\text{DANGER INDEX MATRIX (D)} = \begin{bmatrix} D_{11} & D_{12} & D_{13} & D_{14} & D_{15} \\ D_{21} & D_{22} & D_{23} & 0 & D_{25} \\ D_{31} & D_{32} & & & D_{35} \\ 0 & & & & 0 \\ 0 & & & & 0 \\ 0 & & & & 0 \\ D_{81} & 0 & 0 & 0 & D_{85} \end{bmatrix} \begin{matrix} 250 \end{matrix}$$

FIG. 18

$$\text{VALUE MATRIX (V)} = \begin{bmatrix} V_{11} & V_{12} & V_{13} & V_{14} & V_{15} & V_{16} & V_{17} & V_{18} \\ V_{21} & V_{22} & V_{23} & & & & & V_{25} \\ 0 & & & & & & & 0 \\ 0 & & & & & & & 0 \\ V_{51} & 0 & 0 & 0 & 0 & 0 & 0 & V_{11} \end{bmatrix} \begin{matrix} 252 \end{matrix}$$

FIG. 19

$$\text{AREA PRIORITY MATRIX} = \begin{bmatrix} P_{11} & P_{12} & \text{------} & P_{1M} \\ P_{21} & P_{22} & \text{------} & P_{2M} \\ 0 & & & 0 \\ 0 & & & 0 \\ 0 & & & 0 \\ 0 & & & 0 \\ P_{N1} & 0 & 0 & P_{NM} \end{bmatrix} \begin{matrix} 254 \end{matrix}$$

FIG. 20

DANGER WARNING AND EMERGENCY RESPONSE SYSTEM AND METHOD

BACKGROUND

These inventions relate to the field of Danger Warning and Emergency Response Systems and Methods, and more specifically, to comprehensive danger warning and emergency response systems and methods based on the use of GPS location signals used with surveillance satellites, surveillance aircraft/pilotless drones, and ground based mobile and stationary surveillance to detect dangerous situations. Information concerning dangerous situations which exist or may develop and threaten different populations of people in different areas of a county, state, or country, or a group thereof, is transmitted to a warning/command control center which, in-turn, relays broadcast warning messages via pager satellites and/or radio networks or other broadcast communication networks to remote warning devices. The warning devices may be stationary and/or may be mobile units carried in an automobile or on a person, and are responsive to warning signals directed to such devices that are located within specific geographic coordinate locations or areas as determined by the GPS location signals. Expert system technology, such as neural networks and fuzzy logic, is used to derive the emergency warning and dispatch signals.

It is often the case in our complex and advanced technological society that dangerous situations evolve which may threaten the life or property of individual or potentially many hundreds, thousands or even millions of people or to destroy or damage valuable physical assets or natural resources. Such dangerous situations commonly arise because of adverse weather conditions such as violent storms, blizzards, tornados, hurricanes, tidal waves or even extreme conditions of cold or heat. Dangerous situations may also arise because of fire, including, for example, extensive forest or range fires which may threaten populated areas or areas containing other valuable property or natural resources. Another form of dangerous situation may arise from criminal activities, such as are committed by robbers, murderers, rapists, gangs, terrorists or other thugs. In addition to criminal activity, general civil unrest and riots often give rise to dangerous situations in heavily populated areas.

Other dangerous situations that may occur include dangerous chemical spills or toxic waste emissions including emissions into the air or into a water supply or river which is relied upon by large numbers of people. Smog or bad air or other pollution alerts represent another danger we face today. Certain traffic conditions giving rise to unusual congestion and dangerous driving conditions represent another situation that people commonly encounter in our complex society. Contagious diseases may create other potentially dangerous situations that may begin in a localized region and spread outward from that region, endangering many people. Hostile military activities represent yet another dangerous situation that may threaten large population areas. Volcanic disturbances and earthquakes represent additional dangerous situations that may be monitored with the disclosed inventions.

These and other dangerous situations are frequently encountered in our society today. Increasing population densities make it even more urgent that modern technology be employed to the maximum extent to warn large segments of population of impending dangers, and, where possible, to dispatch appropriate assistance to those areas. The need for emergency alerting systems and the possibility of implementing such systems have been recognized in recent years. Examples of such attempts are found in the following U.S. Pat. Nos.: 5,278,539; 4,956,857; 4,993,059; 4,887,291 each of which is incorporated herein by reference in its entirety. These systems variously make use of on-premise facility alarm sensors that are used to relay warning signals to appropriate control centers via radio and/or wire line transmission links. Cellular radio links are often used for such emergency communications.

Expert system technology, including neural networks, and fuzzy logic control systems, has also been developed and adapted to a wide variety of uses. In general, expert systems using fuzzy logic inference rules are well known, as described in the following publications, each of which is incorporated herein by reference in its entirety: Gottwald, Siegried, Fuzzy Sets and Fuzzy Logic: The Foundations of Application—from a Mathematical Point of View, Vieweg & Sohn, Braunschweig Wiesbaden (1993), ISBN 3-528-05311-9; McNeil, Daniel, Fuzzy Logic, Simon & Schuster, New York (1993), ISBN 0-671-73843-7; Marks, Robert J. II, Fuzzy Logic Technology and Applications, IEEE Technology Update Series (1994), ISBN 0-7803-1383-6, IEEE Catalog No. 94CR0101-6; Bosacchi, Bruno and Bezdek, James C, Applications of Fuzzy Logic Technology, Sep. 8–10, 1993, Boston, Mass., sponsored and published by the SPIE—The International Society for Optical Engineering, SPIE No. 2061, ISBN 0-8194-1326-7; Mendel, Jerry M., "Fuzzy Logic Systems for Engineering: A Tutorial", Proceedings of the IEEE, Vol. 83, No. 3, March 1995, pgs. 345–377; Jang, Jyh-Shing Roger, Sun, Chuen-Tsai, "Neuro-Fuzzy Modeling and Control", Proceedings of the IEEE, Vol. 83, No. 3, March 1995, pgs. 378–406; Schwartz, Klir, "Fuzzy Logic Flowers in Japan", IEEE Spectrum, July 1992, pgs. 32–35; Kosko, Isaka, "Fuzzy Logic", Scientific American, July 1993, pgs. 76–81; Cox, "Fuzzy Fundamentals", IEEE Spectrum, October 1992, pgs. 58–61; Brubaker, "Fuzzy Operators", EDN, Nov. 9, 1995, pgs. 239–241.

In addition, many patents have been issued for various applications of GPS for locating and tracking objects, and for navigation purposes. Various configurations of GPS-based tracking and communication systems and methods are described in the following documents, each of which is incorporated herein by reference in its entirety: Logsdon, Tom, The Navstar Global Positioning System, Van Nostrand Reinhold, New York (1992), ISBN 0-422-01040-0; Leick, Alfred, GPS Satellite Surveying, John Wiley & Sons, New York (1990), ISBN 0-471-8 1990-5; Hurn, Jeff, GPS—A Guide to the Next Utility, Trimble Navigation, Ltd., Sunnyvale, Calif. (1989); Hurn, Jeff, Differential GPS Explained, Trimble Navigation Ltd., Sunnyvale, Calif. (1993); and U.S. Pat. Nos.: 5,438,337; 5,434,787; 5,430,656; 5,422,816; 5,422,813; 5,414,432; 5,408,238; 5,396,540; 5,390,125; 5,389,934; 5,382,958; 5,379,224; 5,359,332; 5,418,537; 5,345,244; 5,334,974; 5,323,322; 5,311,197; 5,247,440; 5,243,652; 5,225,842; 5,223,844; 5,202,829; 5,187,805; 5,182,566; 5,119,504; and 5,119,102.

While the above listed patents and known applications of GPS and fuzzy logic/expert system technology represent important innovations, none of these systems or methods take full advantage of the capability of GPS location systems used in combination with one or more earth scanning satellites, aircraft, and mobile and stationary ground based surveillance stations together with modern radio paging, cellular telephone or other broadcast communication networks to implement a truly wide area emergency warning and assistance dispatch system wherein a great multiplicity of people are simultaneously warned of impending or existing dangers and of the degree of danger that may be present in different geographical areas. In view of the ever-increasing occurrence of various dangerous or hazardous situations as noted above, it is critically important that these advanced technologies be brought together in an organized manner to warn various populations that may be subject to such dangerous situations.

OBJECTS OF INVENTION

It is therefore an object of these inventions to provide danger warning and emergency response systems and methods that may be operated simultaneously to warn select multitudes of people of impending dangers or disasters.

It is a further object of these inventions that the warnings received by individual people include indications of the type and degree of danger to which an individual or area is exposed.

It is yet another object of these inventions to provide such danger warning and emergency response over very large geographic areas.

Another object of these inventions to provide such danger warning and emergency response on a localized basis in a small geographic area or group of areas.

It is a further object of these inventions to provide simultaneous warnings to multiple people, with different persons receiving different warning signals depending upon the geographic location of the individuals or groups receiving the warning message or messages.

It is a further object of these inventions to provide danger warning and emergency response systems and methods that may be used for a wide range of emergency and dangerous situations including dangerous weather conditions, dangerous civil unrest, dangerous criminal activity, dangerous traffic situations, dangerous environmental situations, and dangerous medical situations and other dangerous situations that may evolve over specific geographic areas.

It is yet another object of these inventions to provide the danger warning and emergency response capability using existing radio location systems, such as GPS satellites, together with surveillance satellites and or surveillance aircraft/pilotless drones for location and danger indication purposes, and using existing pager satellites and paging systems or other emergency broadcast networks to generate warning and emergency dispatch messages.

It is yet another object of these inventions to provide a danger warning and emergency response systems and methods that may employ a range of radio signal broadcast media including broadcast television and radio signals as well as cable television, and other land based cable and or fiberoptic communications networks to broadcast warning signals to individual warning devices.

It is yet another object of these inventions is to make use of expert system technologies such as fuzzy logic using fuzzy inference rules to generate danger indices depending upon the location of the dangerous situation, the direction of movement of the dangerous situation, the vulnerability of individuals, and the distance of individuals from the dangerous situation.

A further object of these inventions is to provide danger warning and emergency response systems and methods that make use of neural network analysis of image and/or surveillance information to detect particular types of dangerous situations.

Further objects of the invention are apparent from reviewing the summary of the invention, detailed description and dependent claims which are set forth below.

SUMMARY OF INVENTION

One aspect of the invention is a method of providing an automated, wide-area, danger warning and emergency which includes the steps of (a) detecting a dangerous situation from a detection location, (b) transmitting information signals describing the dangerous situation from the detection location via radio transmission signals to a control center for analysis, analyzing the received information signals in the control center in computer systems employing expert system technology, (d) determining in the control center the degree of danger and its geographic extent based on analysis of the received information signals, (e) generating in the control center a danger warning and emergency response including a danger index indicating a degree of danger within at least one geographic area, (f) broadcasting the danger warning and emergency response from the control center to a plurality of remotely located warning devices each of which has a GPS receiver and the ability to calculate its own location in GPS coordinates, (g) receiving via the broadcast signals the danger warning and emergency response in the remotely located warning devices, and comparing in each remotely located warning device the coordinates of the dangerous situation with its own GPS coordinates for determining the extent to which each remotely located warning device is in danger, and (h) automatically issuing from each remotely located warning device a warning corresponding to the extent to which the issuing remotely located warning device is in danger.

The wide-area coverage of the present invention includes multiple population areas, nation-wide areas or world-wide areas or selected areas thereof.

Other features of this aspect of the invention include surveying the earth from one or more surveillance platforms supported on satellites, airborne craft, balloons or ground based mobile vehicles or stationary structures, and surveying the earth with any one or more of conventional equipment or personnel supported on the platform including video scanning cameras, infrared scanners, chemical detectors, infrared detectors or sensors, image or surveillance signal analyzers, neural networks, high speed vector processing or parallel processing systems, or human surveyors. Preferably each of the platforms has a GPS receiver which determines the GPS coordinates of its supporting surveillance platform, and estimates the GPS coordinates of the detected danger when laterally offset therefrom. These GPS coordinates of the surveillance platform are included in the transmission to the control center.

Still other features of this aspect of the invention are analyzing by employing fuzzy logic and fuzzy inference rules, and using expert knowledge database retrieval and relating the stored database information to the type of danger and the location of dangerous situations.

Still other features of this aspect of the invention are defining the geographic extent of danger in GPS coordinates, defining the geographic extent of the danger as bounded by the radii of two circles centered on a dangerous situation whose center is defined by GPS coordinates, and as bounded by angular sectors between the radii.

Other features of this aspect of the invention include deriving the danger index from parameters including the distance between the dangerous situation and a particular warning device, the rate at which the dangerous situation may be approaching a particular warning device, the vulnerability of a person or property associated with a particular warning device to a particular dangerous situation, and the type of a particular dangerous situation; defining a vulnerability index for a particular area depending upon the presence of a particular structure, natural resource, or population density of the area; and establishing an emergency response dispatch priority using vulnerability factors characterizing different geographic regions. Thus, a dispatch priority may be established by analyzing the vulnerability of a particular structure to one type of a dangerous situation, such as, violent weather situations or earthquakes of various types, and the vulnerability of people to another type of dangerous situation, such as, radiation or disease.

Another feature of this aspect of the invention includes displaying and communicating by visual, wire, voice, synthetic speech, sound or other conventional alert devices in the control center, which may be a warning and command type control center, the results of the surveillance and analysis of signals received from the detection locations or surveillance platforms to alert an operator thereof of the dangerous situation in the surveyed region or regions.

Still further features of this aspect of the invention include transmitting the danger warning and emergency response via a radio link to a pager satellite network or to a ground based pager network or to a ground based broadcast network, and then to the warning device.

Further features of this aspect of the invention include transmitting messages containing a plurality of danger indices and geographic coordinates identifying the regions corresponding to each danger index, identifying predefined danger emergency warning areas and a danger index for each such area relative to an identified dangerous situation and the degree of danger it represents, and broadcasting to remote warning devices located on persons, in mobile land vehicles, in airborne craft, on vessels at sea, or in stationary structures.

Still further features of this aspect of the invention include the remotely located warning device determining that it is located within the geographic area defined by the GPS coordinates of the dangerous situation, and, then, activating warning signals indicating the degree of danger which was communicated via the danger index in the received signals. Depending upon the location of the remotely located warning device, different degrees of danger exist relative to the nature of the dangerous situation as indicated by the received broadcast signals, and if, on one hand, the remotely located warning device be located within a geographic area defined as having a very high danger, then that device will indicate via an audible, visual, vibratory or other warning device the existence of a very dangerous situation, whereas, if, on the other hand, the warning device be located in an area adjacent to a very dangerous situation, then that device will indicate via an audible, visual, vibratory or other warning device the existence of a less than very dangerous situation.

Another aspect of the invention includes receiving the danger warning and emergency response in a control center remote from the warning command control center which dispatches and controls emergency response services to assist in alleviating the dangerous situation. The dispatching of emergency services may be based on a priority index derived from both danger and value indices.

Another feature of this aspect of the invention includes receiving the broadcast danger warning and emergency response directly in emergency response vehicles manned by emergency personnel located in the most dangerous areas who, upon decoding the danger warning and emergency response will immediately know that they are in the proximity of the dangerous situation and may immediately respond accordingly, and determining the locations of such emergency response vehicles or persons by using GPS technology.

Another aspect of the invention includes broadcasting the danger warning and emergency response via a conventional communication network television, AM/FM radio, cable, and fiber optic networks. As before, so, too, this aspect of the invention includes receiving a danger index including geographic coordinates defining regions appropriate to each degree of danger corresponding to the geographic area in which the receiver which may include, for example, a television set, a computer, or a radio receiver is located indicating the degree of danger in which users located in particular areas may find themselves. Where the remotely located warning device may be a television set, the invention includes, receiving in the television set the danger warning and emergency response, displaying on the display screen of the television set an emergency message customized to the location of the television, and identifying in the emergency message the danger and its position from the television display screen based on information resulting from a comparison of electronic data from different sources occurring within the television set. Where the remotely located warning device is a radio receiver the invention includes receiving on the radio receiver the danger warning and emergency response, annunciating from the radio an emergency message customized to the location of the radio or radio receiver, and identifying in the emergency message the danger and its position from the radio annunciator based on information resulting from a comparison of electronic data from different sources occurring within the radio receiver.

Additional features of the present invention include maintaining selected ones of the remotely located warning devices in a stand-by mode, transmitting from the control center control signals to said selected ones of the remotely located warning devices to switch from a stand-by mode to a full-receive mode enabling receiving messages from the control, and short wave transmitting codes from the remotely located warning devices back to the control center indicating that the selected danger warning signals have been received.

The preferred embodiments of the inventions are described below in the Figures and Detailed Description. Unless specifically noted, it is applicant's intention that the words and phrases in the specification and claims be given the ordinary and accustomed meaning to those of ordinary skill in the applicable art(s). If applicant intends any other meaning, he will specifically state he is applying a special meaning to a word or phrase.

Likewise, applicant's use of the word "function" in the Detailed Description is not intended to indicate that he seeks to invoke the special provisions of 35 U.S.C. Section 112, paragraph 6 to define his invention. To the contrary, if applicant wishes to invoke the provision of 35 U.S.C. Section 112, paragraph 6, to define his invention, he will specifically set forth in the claims the phrases "means for" or "step for" and a function, without also reciting in that phrase any structure, material or act in support of the function. Moreover, even if applicant invokes the provisions of 35 U.S.C. Section 112, paragraph 6, to define his invention, it is applicant's intention that his inventions not be limited to the specific structure, material or acts that are described in his preferred embodiments. Rather, if applicant claims his invention by specifically invoking the provisions of 35 U.S.C. Section 112, paragraph 6, it is nonetheless his intention to cover and include any and all structures, materials or acts that perform the claimed function, along with any and all known or later developed equivalent structures, materials or acts for performing the claimed function.

For example, the present inventions generate surveillance image information for analysis by scanning using any applicable image or video scanning system or method. The inventions described herein are not to be limited to the specific scanning or imaging devices disclosed in the preferred embodiments, but rather, are intended to be used with any and all applicable electronic scanning devices, as long as the device can generate an input signal that can be analyzed by a computer to detect dangerous situations. Thus, the scanners or image acquisition devices are shown and referenced generally throughout this disclosure, and unless specifically noted, are intended to represent any and all devices appropriate to scan or image a given area.

Likewise, it is anticipated that the physical location of the scanning device is not critical to the invention, as long as it can scan or image the surveillance area or region. Thus, the scanning device can be configured to scan from satellites, aircraft, pilotless drones, or from ground based vehicles or structures as appropriate. Accordingly, the words "scan" or "image" as used in this specification should be interpreted broadly and generically.

Further, there are disclosed several computers or controllers, that perform various control operations. The specific form of computer is not important to the invention. In its preferred form, applicant divides the computing and analysis operations into several cooperating computers or microprocessors. However, with appropriate programming well known to those of ordinary skill in the art, the inventions can be implemented using a single, high power computer. Thus, it is not applicant's intention to limit his invention to any particular form of computer.

Further examples exist throughout the disclosure, and it is not applicant's intention to exclude from the scope of his invention the use of structures, materials, or acts that are not expressly identified in the specification, but nonetheless are capable of performing a claimed function.

BRIEF DESCRIPTION OF THE DRAWINGS

The inventions of this application are better understood in conjunction with the following drawings and detailed description of the preferred embodiments. The various hardware and software elements used to carry out the inventions are illustrated in the attached drawings in the form of block diagrams, flow charts, and neural network and fuzzy logic algorithms and structures.

FIG. 16 illustrates an example of danger index fuzzy logic inference rules.

FIG. 18 is an area danger index matrix useful in the danger warning and emergency response system and method herein disclosed.

FIG. 19 is a area value matrix useful in the systems and methods herein disclosed.

FIG. 20 is an area priority matrix useful in defining the priorities of particular areas for emergency response.

The above figures are better understood in connection with the following detailed description of the preferred embodiments.

DETAILED DESCRIPTION

Detecting Dangerous Conditions by Surveillance

Figure 1:
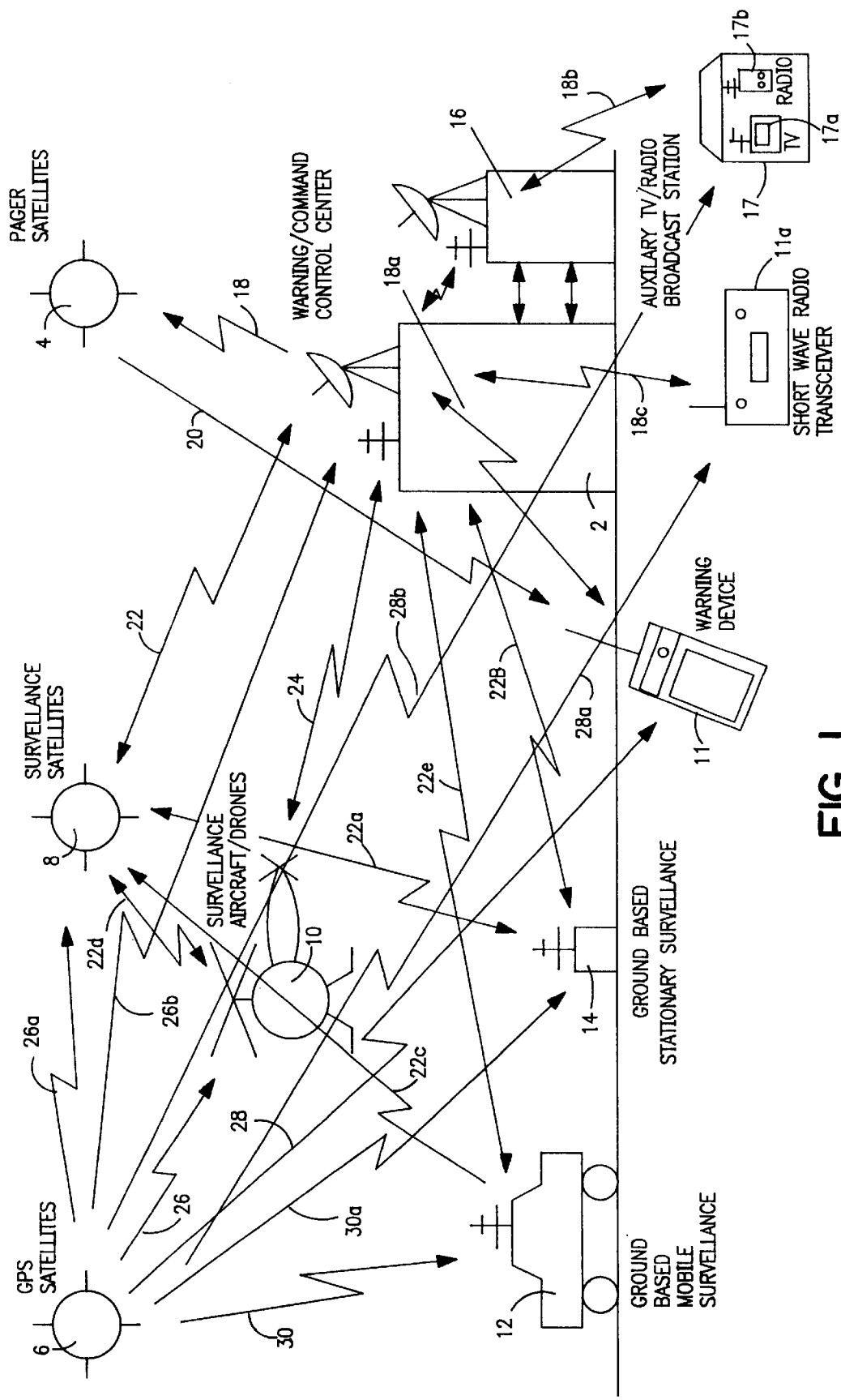
FIG. 1 is a diagram illustrating the overall danger warning and emergency response system and method used to alert via warning devices multitudes of people of dangerous situations and the degree of danger individual persons or areas may be in based on their geographical location.

FIG. 1 illustrates the danger warning and emergency response system and method in accordance with the present inventions. The systems and methods employ surveillance satellites 8 and surveillance aircraft/pilotless drones 10 to monitor and survey areas on earth for dangerous situations and occurrences of threatening events. The surveillance satellites 8 and surveillance aircraft/pilotless drones 10 may make use of standard video scanning techniques, infrared scanning techniques or other surveillance methods to search the earth for dangerous situations. Multiple surveillance satellites 8 may be used to cover large areas of the earth. Different camera types may be used including cameras adapted for wide area coverage and cameras able to focus on very small detailed areas and deliver pictures of those areas to ground based facilities. A great multiplicity of surveillance aircraft/drones 10 may be used with pilotless drones being particularly useful in surveying areas such as dense forest or remote geographic locations for problems that may threaten natural resources. In addition to the surveillance aircraft and surveillance satellites illustrated in FIG. 1, other airborne surveillance equipment may be used including, for example, the use of properly equipped surveillance balloons.

Surveillance of the earth for dangerous situations is also carried out using ground based mobile surveillance units 12 and ground based stationary surveillance units 14 as also illustrated in FIG. 1. Mobile units may include ordinary police patrols and fire patrols as well as other civil agency operations including forest service personnel and municipal employees. Ground based stationary surveillance 14 may include surveillance cameras located in buildings or other structures as well as fire detectors, smoke detectors, chemical detectors, and other types of fixed stationary surveillance devices used to detect various types of dangerous situations.

Transmitting Surveillance Results to Control Center

The surveillance platforms, including satellites 8 and surveillance aircraft/drones 10 along with the ground based mobile surveillance 12 and ground based stationary surveillance 14, transmit the results of their area surveillance directly 22,22a,22b,24 to the warning command/control center 2 of FIG. 1. Alternatively, they may transmit 22c, 22d,22e their signals via satellites 8 for relay 22 to the control center. Such signals may include video pictures, indications from various types of warning devices, verbal messages from surveillance personnel or other types of message information useful to the warning command/control center 2 in analyzing the dangerous situations. The surveillance platforms may communicate with the control center using a cellular network having a voice/data channel as is well known in the communications industry.

The Remotely Located Warning Devices and GPS

Also shown in FIG. 1 is the warning device 11, including a short wave receiver 11a, which may be carried by individuals or located in moving vehicles such as automobiles, trucks, ships at sea, or aircraft. Such warning devices, including a television 17a or radio 17b or a computer-receiver, may also be located in stationary buildings or physical structures 17. The warning device 11,11a,17a,17b includes a GPS receiver capability for receiving GPS location signals 28,28a,28b from multiple GPS satellites 6. As is well known in the art, such signals enable precise location calculation for the warning device 11 any place on the earth using the principles of triangulation based on the receipt of signals from multiple GPS satellites. GPS satellites 6 also transmit signals 26,26a,30,30a to the airborne 8,10 and ground based mobile 12,14 surveillance units for use in locating these units in the overall danger warning and emergency response systems and methods of the present inventions. The surveillance platforms having GPS receivers onboard can transmit the results of their surveillance using their own GPS coordinates if they are experiencing or close aboard the danger themselves. Otherwise, their own GPS coordinates may be used as a basis for estimating the GPS coordinates of the danger when the danger is laterally offset from the present position of the reporting surveillance platform.

The Control Center Transmitting Information Signals to the Remotely Located Warning Devices Using signals from the GPS satellites, the warning device 11,11a,17a,17b knows its precise coordinates and may use this information in cooperation with the warning command/control center 2 to determine whether or not the warning device 11 is in a dangerous situation, and, if so, to what degree that danger exists. The warning command control center 2 transmits via radio link 18 information signals to pagers satellites 4 and/or, alternatively, to ground based pager networks or other broadcast networks, control messages indicating the degree of danger in different geographic areas on the earth. These signals are in turn transmitted via radio links 20 to the warning devices 11 as illustrated in FIG. 1. The control centers 2 may have their own GPS receiver for receiving GPS signals 26b and may transmit all location coordinates as GPS based coordinates derived from their onboard GPS receivers or from the GPS receivers in the surveillance platforms.

Warning Devices Computing Danger to Self

Using the warning signals from pager satellites 4, computers in the warning device 11 may compare the coordinates of the warning device 11 with particular areas designated as being dangerous in the signals from the pager satellite 20. The signals from the warning command/control center 2 relayed via pager satellite 4 will indicate for multiple areas different degrees of danger depending upon the nature of the incident detected. For example, all warning devices located within one mile of a criminal activity may receive a high danger warning signal. By transmitting the geographic coordinates of the area of concern, the warning device 11 may determine whether or not it is located in the high danger area. Similarly, the warning command/control center 2 will transmit via relay pager satellite 4 signals indicating a lesser degree of danger in areas adjoining the area designated as a high danger vicinity. For example, in the case just cited, for warning devices within an area from 2 miles to 3 miles of the criminal activity, the warning device 11 may calculate that it is in an area of moderate danger. Thus, knowing its GPS coordinates enables the warning device 11 to compute the extent to which it is in danger based upon the signals received from the warning command/control center 2 relayed via the pager satellite system 4 of FIG. 1.

In addition to using the warning device 11, the systems and methods of FIG. 1 illustrate transmission 18b via auxiliary TV/radio broadcast stations 16 of the warning messages of the present inventions. These messages, in-turn, may be relayed to any radio receiver 17b or television receiver 17a or other information indicating device within the range of the auxiliary TV/radio broadcast station 16 of FIG. 1. Alternatively, short wave radio transceivers 11a may receive short wave transmissions 18c. Such radio receivers and TV sets can be equipped with GPS receivers to receive GPS signals 28a,28b, or, alternatively, have their location coordinates determined by other conventional devices, such as, radio ranging systems, optic systems, or the like, entered by users. These local location coordinates may be compared with received coordinates corresponding to areas of various degrees of danger in the same manner as used by the warning device 11 and described above. Thus, not only do the portable warning and information indicating devices 11,11a,17a,17b become available for warning of dangerous situations, but all such radio receivers and television receivers and receiver-computers so equipped would be able to present and display information to alert many people simultaneously.

It will thus be appreciated that through the present invention large multitudes of people may be readily warned of the dangerous situation in which they find themselves. For example, subscribers to a paging system may be immediately warned of a danger. Through them, such alerted persons may readily inform other alerting services nearby, such as, local police or T.V. stations (when the latter are not directly alerted by this invention) who may then alert still larger masses of people through their large mass communication networks. As an additional mode of using this invention, the surveillance device may detect people stranded at sea, such as, shipwrecked or disabled craft, and automatically alert the nearest sea and aircraft for help.

Control Center's Surveillance Area Maps and Computation of Danger Indices

Figure 2:
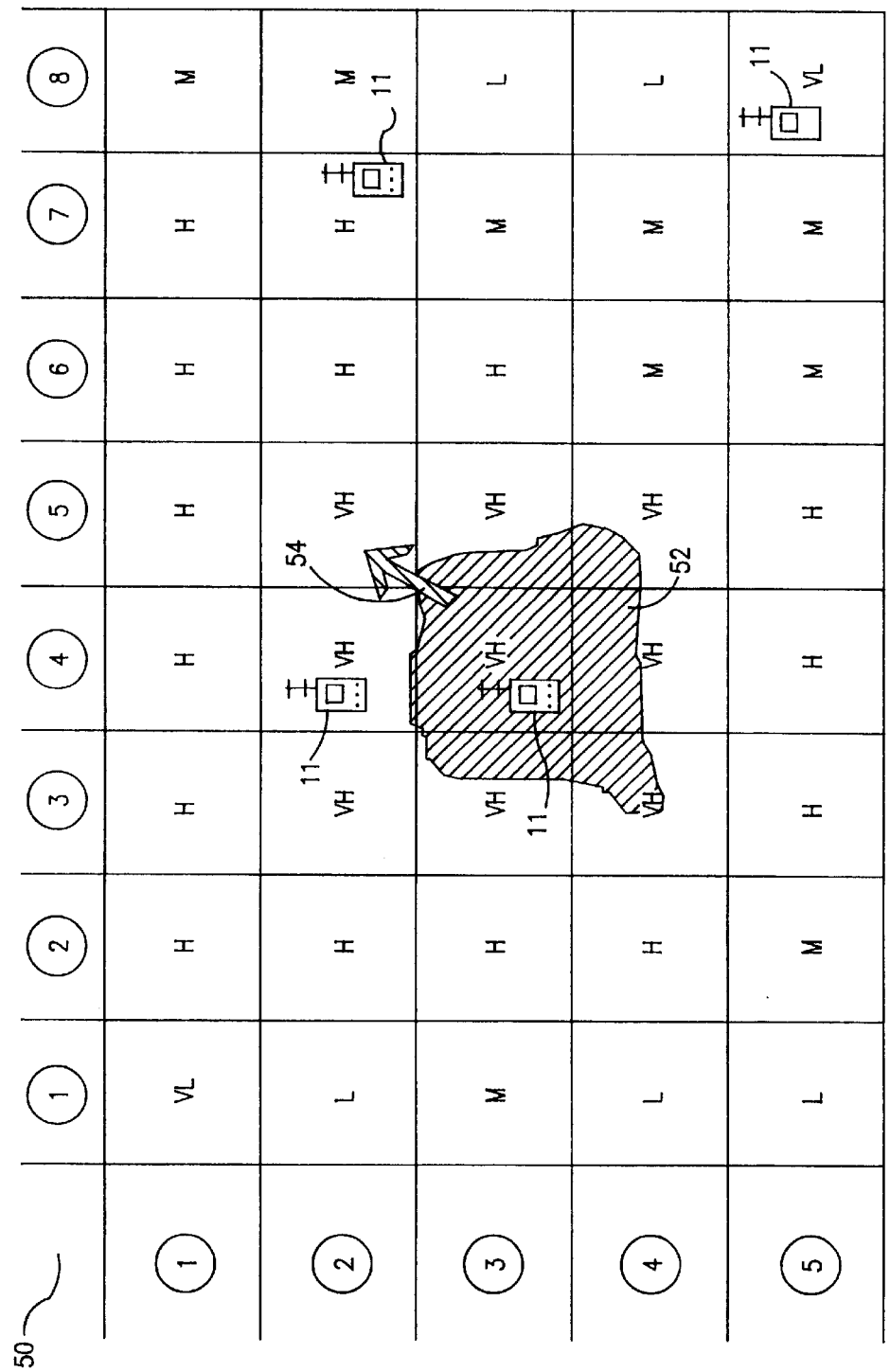
FIG. 2 is an exemplary emergency area warning system map using a rectangular grid to identify particular regions within which warning devices may exist.

FIG. 2 illustrates an example map for a surveillance area 50 typically located at the control center. In this example, the area is divided into rectangular sectors indicated with the row numbers 1 through 5 and the column numbers 1 through 8. The dangerous situation 52 is primarily in quadrant row 3 column 4 but also extends into adjacent quadrants as illustrated in the figure. In addition, the dangerous situation, identified by the surveillance platform and plotted on the map, is moving in the direction indicated by arrow 54 with a determinable velocity. The dangerous situation 52 may be, for example, a fire, an area of civil unrest, an area of criminal activity, an area adversely effected by weather, an area of military activity, an area endangered by flooding waters, or an area with a outbreak of disease.

a. Predefined Danger Emergency Warning Area Maps

As indicated in FIG. 2, each of the rectangular sectors in the survey area 50 has been graded by the control center with a danger index relative to a particular identified dangerous situation. The following indices are used in this example:

VL=Very Low

L=Low

M=Moderate

H=High

VH=Very High

It can be seen from examination of FIG. 2 that the areas immediately effected by the dangerous situation 52 are given the "Very High" danger index. Regions surrounding those in very high danger areas are given a "High" danger index, with the exception of areas out of the direction of travel of the disaster which are given a danger index of "Moderate". Progressing outward from the dangerous situation 52, lower degrees of danger exist as indicated by the danger indices in the various rectangular sectors of FIG. 2.

Also indicated in FIG. 2 are multiple warning devices 11 of the type depicted in FIG. 1. These devices are located in different rectangular quadrants as shown in the figure. Of course, depending upon the distribution of population, vehicles or other structures with warning devices, any individual rectangular sector of FIG. 2 may have many warning devices 11. As shown in FIG. 1 and discussed above, the warning devices 11 receive information signals, i.e., danger warning and emergency response dispatch messages, via the broadcast communication system, for example, pager satellite 4 via radio links 20 of FIG. 1. Each warning device 11 also receives location signals, for example, from GPS satellites 6 as indicated in FIG. 1. Using the GPS location signals, each warning device 11 of FIG. 2 computes its exact location on the surface of the earth. Also, with the warning danger and emergency response information signals received from the pager satellite 4 of FIG. 1, the warning devices 11 of FIG. 2 are able to readily identify sectors and the boundaries of particular sectors in FIG. 2 and the danger index for each sector which was transmitted from the control center via the pager satellite 4 or other broadcast network of FIG. 1. Each warning device 11 will be able to determine in which particular coordinate sector it is located, and then generate the appropriate warning signal based on the received warning message and its own GPS coordinates.

b. Variable Danger Emergency Warning Area Maps

While the map of FIG. 2 has been indicated as a fixed coordinate system, it is also possible to use variable coordinate systems. In this case, no predefined danger emergency warning area map with predetermined regions exists. Instead, received broadcast information signals indicate directly in the messages the boundaries of particular dangerous areas and the danger index associated with those boundaries as determined from the nature of the dangerous situation 52 of FIG. 2.

c. Wide Area Maps

Figure 3:
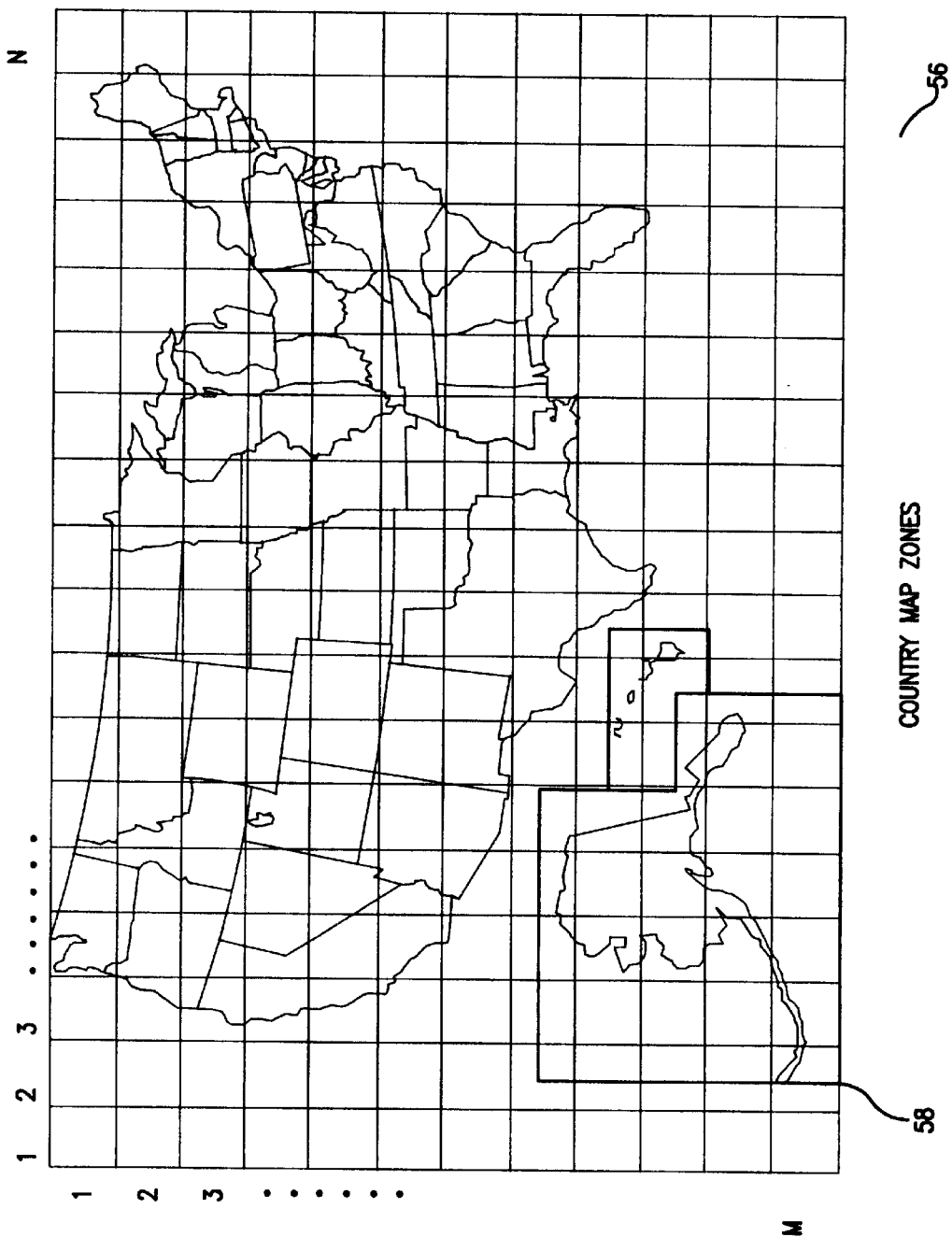
FIG. 3 is an exemplary emergency area warning system overlaid on a map of the United States, with a more detailed map of the state of Alaska.
Figure 4:
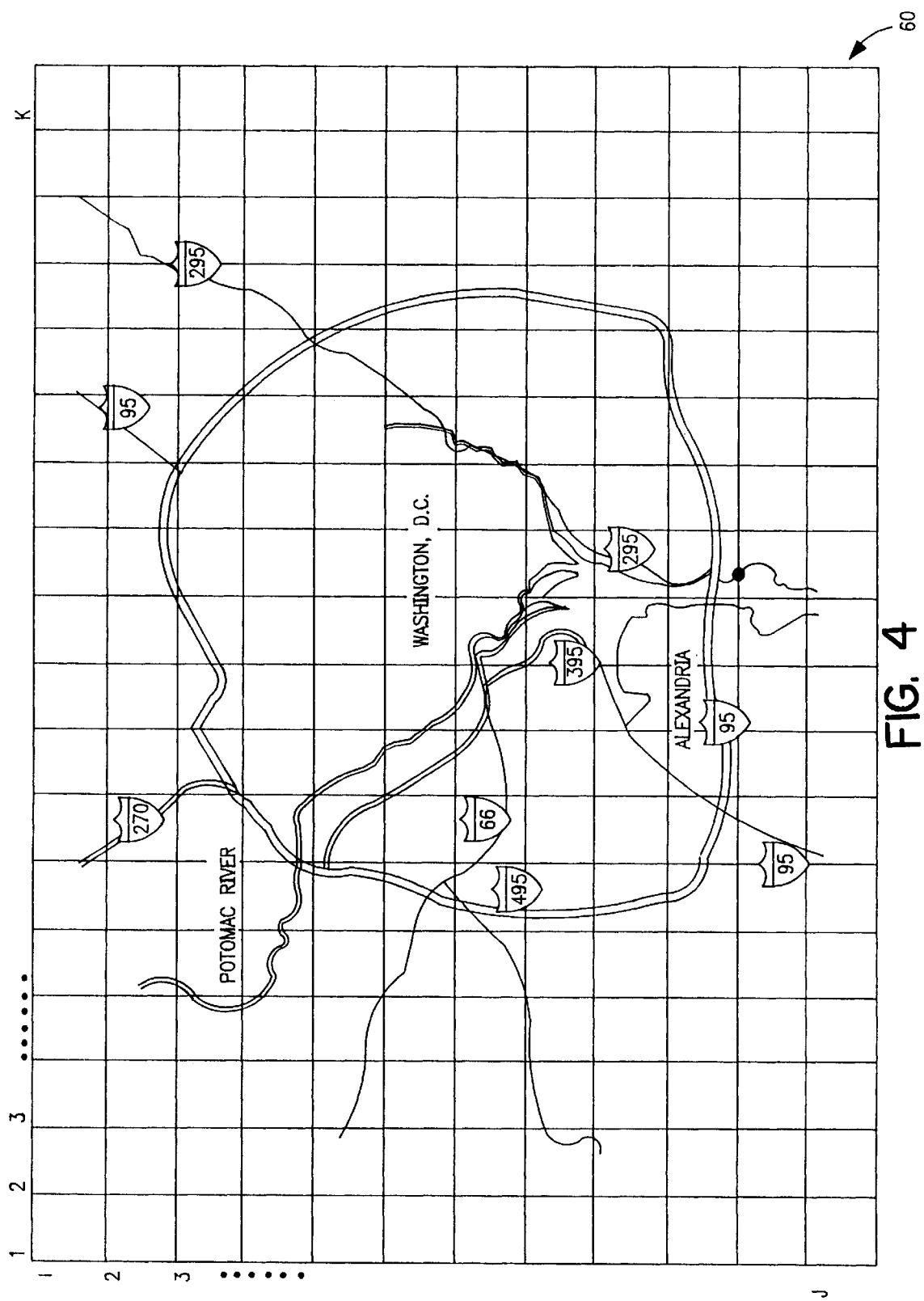
FIG. 4 is yet another example of an emergency area warning map using a rectangular grid to define specific areas within the city of Washington D.C.

FIG. 3 illustrates the use of a map 56 of the type discussed above in FIG. 2 to cover a large geographic area such as the entire United States. Such a map might be useful, for example, in warning particular areas of the country concerning global weather conditions. Also shown in FIG. 3 is a smaller map 58 covering the state of Alaska. Similarly, FIG. 4 indicates a map 60 of the type discussed above in FIG. 2 for use in a particular city, in this case Washington D.C. Of course smaller areas including sections of cities or neighborhoods may similarly be mapped with defined sectors and areas for receiving specific warning and emergency response dispatch messages for dangerous situations that may exist on a localized basis. An example may be a robbery of a local bank where police may want to notify people in the vicinity of the bank of the danger that exists.

d. Circular Area Maps

Figure 5:
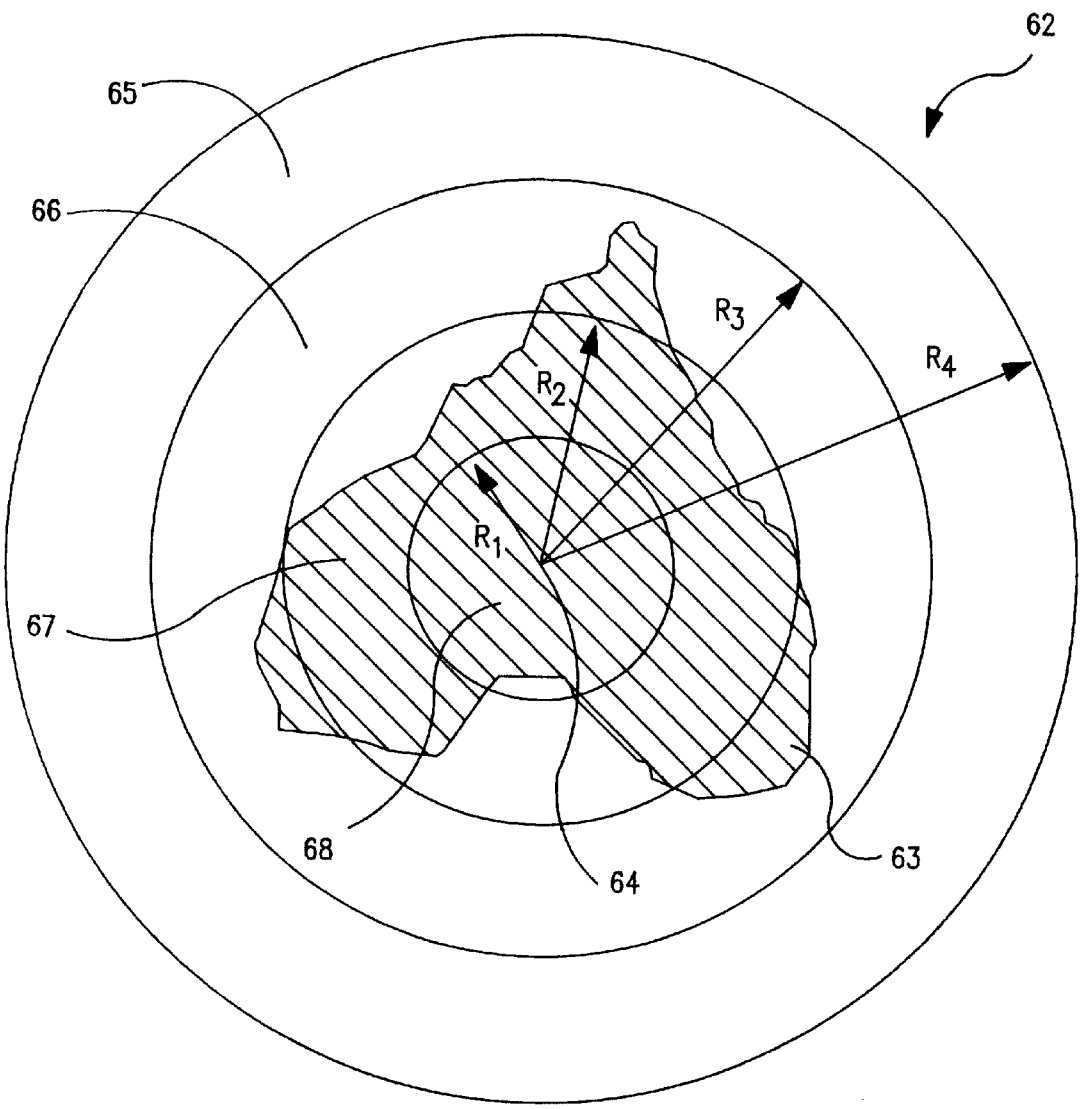
FIG. 5 is an exemplary emergency area warning system map using a circular grid to identify particular concentric ring regions within which warning devices may exist.
Figure 6:
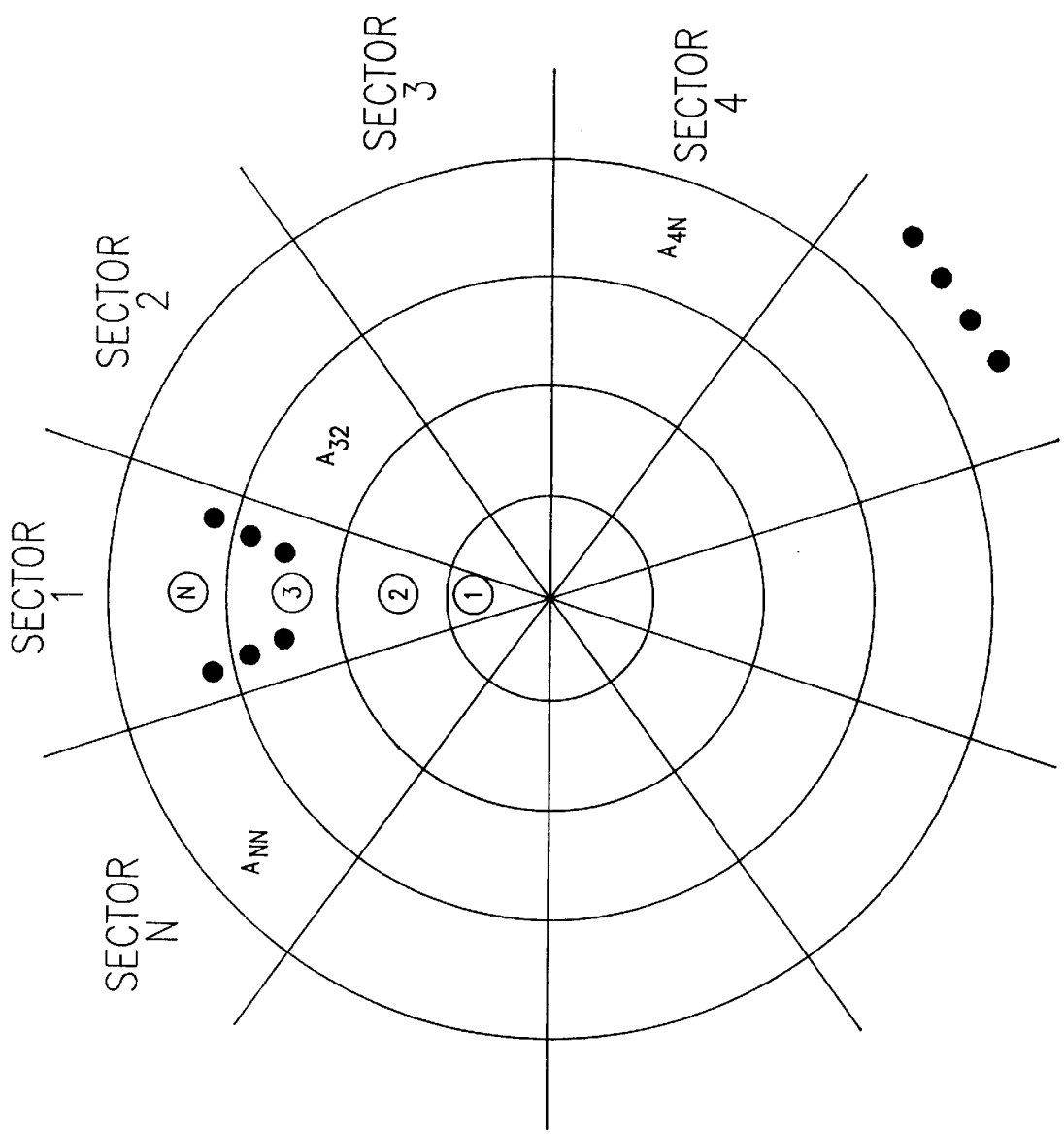
FIG. 6 is an example of a circular grid like FIG. 5 with additional defined angular sectors to further localize warning devices and dangerous situations.

As a useful alternative to the rectangular maps of FIGS. 2, 3 and 4, FIG. 5 depicts the use of a circular area map 62 with concentric zones or regions 65, 66, 67 and 68. The dangerous situation 63 has its center at 64 and extends through zones 66, 67 and 68 as illustrated. The respective regions are of radius R1, R2, R3 and R4. FIG. 6 shows a further refinement of FIG. 5 with angular sectors 1 through N. Such sectors permit radial and angular location of warning devices 11 and dangerous situations as broadcast via warning messages herein disclosed.

Warning Device Block Diagram

Figure 7:
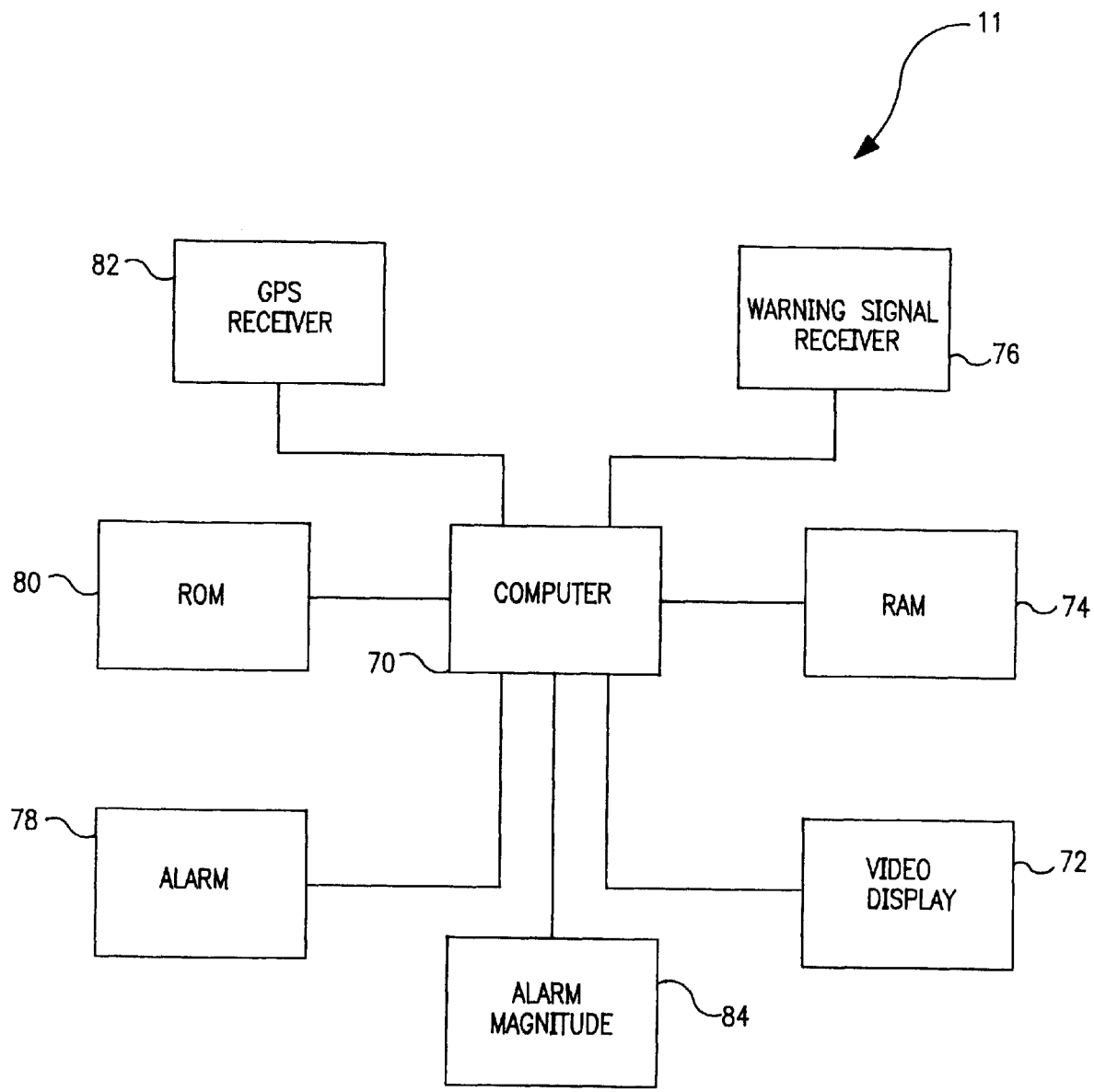
FIG. 7 is a block diagram of a warning device useful in the present inventions.

FIG. 7 depicts a block diagram for a warning device 11 of the type described above. The warning device 11 includes a computer 70, which may be a microprocessor or special controller, together with associated ROM (read only memory) 80 for program and data storage and a RAM (random access memory) 74 used for execution of programs and temporary storage of data received via GPS receiver 82 and warning signal receiver 76. The GPS receiver 82 receives signals from GPS satellites such as GPS satellite 6 of FIG. 1 to enable computation of the location of a warning device 11 by the computer 70. The warning signal receiver 76 receives broadcast danger warning and emergency response dispatch signals from the broadcast communication systems such as pager satellite 4 of FIG. 1. The computer 70 determines its physical location on the earth, and whether or not it is located in an area of danger as indicated by the received broadcast messages. If a dangerous situation is detected, the computer 70 will activate alarm 78 which may be an audible or visible alarm or, perhaps, a vibrating device of the type used in pocket pagers commonly employed today. The computer 70 also may have an output to a video display device 72 for indication of message information including possibly the danger index received from warning signal receiver 76. This display may be integral to the warning device 11 and may be viewed by a user after being notified of the dangerous situation via alarm 78. An alarm magnitude control 84 is also indicated in FIG. 5, which enables the user to adjust the level of sound or degree of vibration or other alarm parameters according to individual preferences.

Control Center Block Diagram

Figure 8:
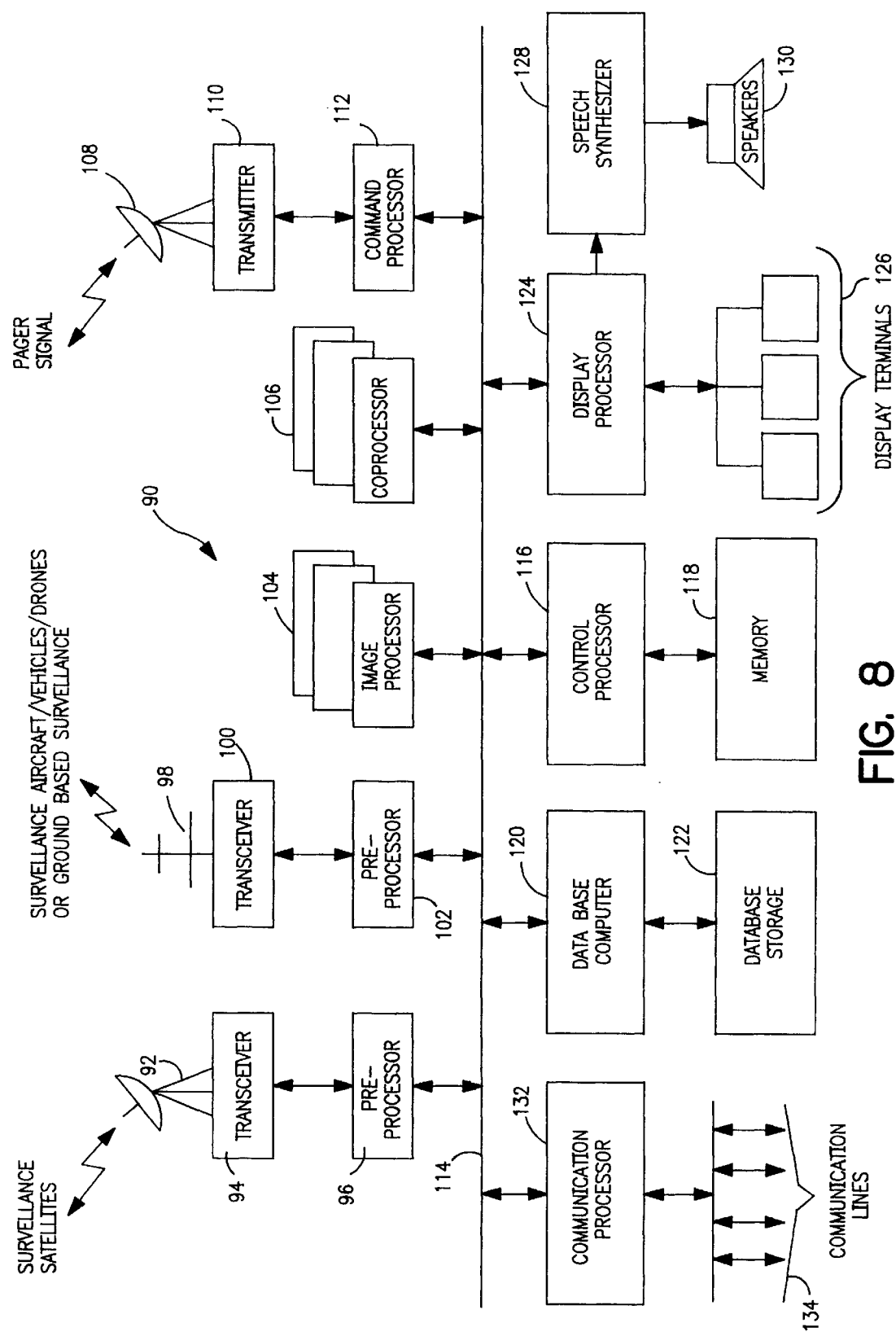
FIG. 8 is a block diagram illustrating the configuration of a warning control center useful in the present inventions.

FIG. 8 illustrates in more detail the structure of the communication and control system equipment 90 contained in the warning command/control center 2 of FIG. 1. System 90 includes a space signal receiving antenna 92 for receipt of signals from surveillance satellites 8 of FIG. 1. The input signals from the surveillance satellite are fed through transceiver 94 to preprocessor 96 for connection to communication bus 114 as illustrated in FIG. 8. The transceiver 94 is capable of both receiving and transmitting signals to and from the surveillance satellite 8 for use in the danger warning and emergency response communication network. The warning command/control center 90 is capable of transmitting control signals, including GPS based command signals, via transceiver 94 and antenna 92 to surveillance satellites 8 to direct surveillance of particular areas, focus on particular fields of view in the areas to be surveyed, select between various surveillance equipment, including video scanning cameras, infrared cameras, and other special camera equipment as may be required to properly survey selected areas of the earth. The preprocessor 96 of FIG. 8 provides an interface between control signals from the communication bus 114 and the transceiver 94 as well as a communication processor function for signals received via transceiver 94 from surveillance satellites 8 of FIG. 1. The preprocessor 96 is capable of formatting messages to and from the surveillance satellite and controlling communications between the transceiver 94 and the surveillance satellite 8.

In addition, as illustrated in FIG. 8, the warning control center 90 includes antenna 98 for transmission and receipt of surveillance aircraft/vehicle/drone or ground based surveillance signals. The antenna 98 is connected via transceiver 100 to preprocessor 102 which in turn is connected to communication bus 114 of the warning control center 90 as illustrated in FIG. 8. The preprocessor 102 controls communication between the warning command/control center 90 and the various surveillance equipment located in aircraft, vehicles, or pilotless drones or in ground based surveillance as indicated in FIG. 1. Just as in the case of communication with surveillance satellite 8, the warning control center 90 may transmit command/control messages, including GPS based command signals, to the various ground based and aircraft surveillance equipment via the preprocessor 102 and transceiver 100.

The warning control center 90 also includes image processors 104 with associated co-processors 106 to perform analysis of received image signals generated via video scanning from the surveillance satellites, surveillance aircraft or ground based surveillance equipment of FIG. 1. The image processors 104 and co-processor 106 are especially adapted for high-speed parallel image processing and may include the use of such techniques as neural networks and high speed vector processing computers. The use of neural networks is discussed in more detail below.

The warning control center 90 also includes control processor 116 with memory 118 which receives input signals from the various surveillance equipment discussed above and generates warning control signals for transmission via pager or other broadcast communication media as discussed above. The control processor 116 may be implemented using various control system strategies including, for example, expert system technology and/or fuzzy logic approaches. More particularly the use of fuzzy logic inference rules to generate the necessary danger warning and emergency response control signals is discussed in more detail below.

The danger warning and emergency response messages are transmitted via command processor 112 and transmitter 110 through antenna 108 to the pager satellite 4 of FIG. 1. In addition, such command control messages may be sent via communication processor 132 of FIG. 6, which is in-turn connected to communication lines 134 for communication with, for example, auxiliary TV/radio broadcast station 16 of FIG. 1. As discussed above, this approach using communication processor 132 and the communication lines 134 will enable operation of the disclosed danger warning and emergency response message control system using ordinary broadcast radio and television systems including the use of cable systems.

Database computer 120 with database storage unit 122 contains information characterizing particular regions or areas to be surveyed including information on the vulnerability of particular areas to particular types of dangerous situations including, as well, information on the value of properties that may be contained in such regions. This information is particularly useful in generating danger warning signals and emergency response dispatch signals. For example, select areas may have very high population densities which may be very vulnerable to particular weather or other types of emergency situations. Also, certain physical structures may be vulnerable to certain types of disasters. Highly dense forested areas may be vulnerable to forest fires, and forested areas containing high population densities may be even more vulnerable. As discussed in more detail below, the use of such vulnerability factors characterizing different regions to be surveyed may be used to establish appropriate warning danger index levels and to establish priorities for emergency response dispatch.

The display processor 124 along with display terminals 126 of FIG. 6 are used at the warning command/control center 2 to display the results of the surveillance and analysis of signals received from surveillance equipment to inform operators of dangerous situations in various regions being surveyed. In addition, speech synthesizer 128 and speakers 130 may be used to produce audible warning signals to control center operators and personnel using the warning control center 90 of FIG. 8.

Figure 9:
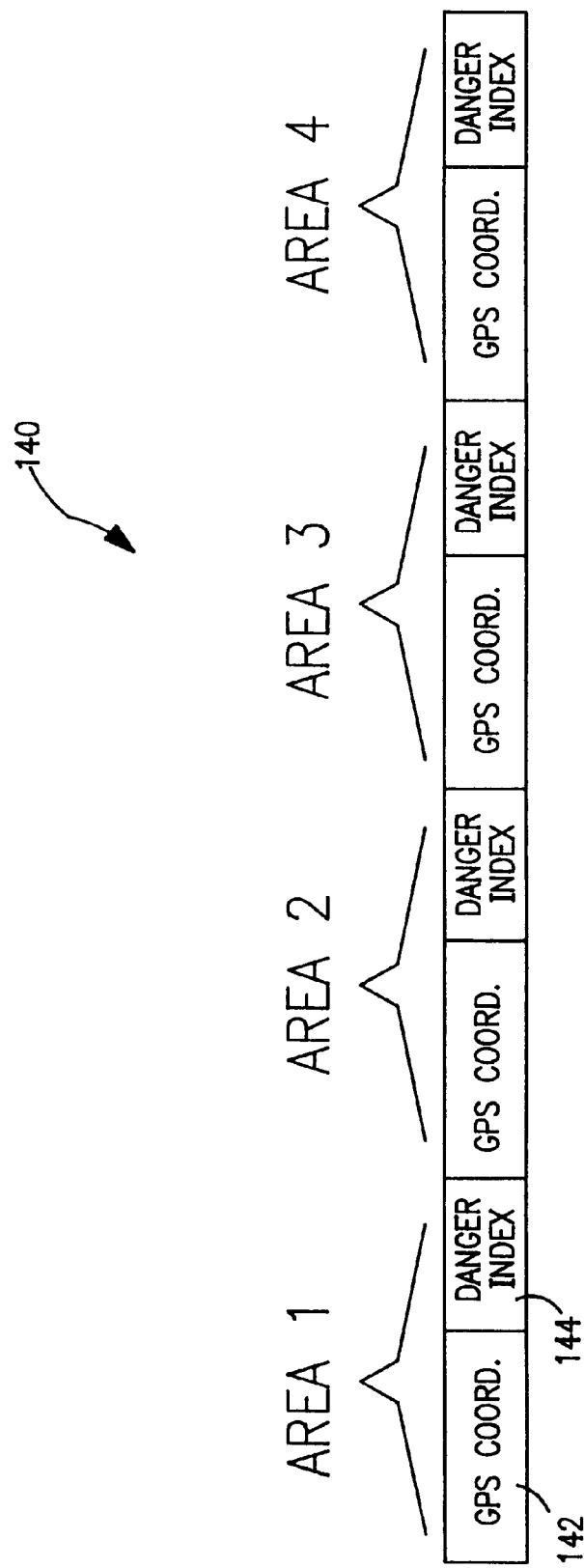
FIG. 9 illustrates the structure of a broadcast danger index message useful in the present invention.

FIG. 9 indicates the general structure of a broadcast danger index message 140 transmitted from the control center via, for example, pager satellite 4 of FIG. 1. The message includes message fields as indicated for various areas under surveillance. For each area, the message includes GPS coordinates of the area boundaries 142 along with a calculated danger index 144 for that particular area. Different coordinates and danger indices are transmitted for each of the areas for which a dangerous situation may exist. As discussed above, the warning devices 11 of FIG. 1 compare the calculated GPS location coordinates of individual warning devices with the received GPS boundary coordinates in successive sections of the broadcast danger index message of FIG. 9. If a particular warning device 11 determines that it is located within the boundaries defined by the GPS coordinates corresponding to a particular area, then the warning device 11 will activate warning signals indicating the degree of danger as communicated via the danger index 144 in the broadcast danger index message 140.

In the case of the circular warning areas of FIGS. 5 and 6, the broadcast danger index message 140 of FIG. 9 may indicate only the GPS coordinates of the center of the dangerous situation as illustrated in FIG. 5. The message will then indicate the radius of successive concentric circles defining the concentric warning areas around and in the vicinity of the dangerous situation. For example, in the situation of FIG. 5 different danger indexes would be indicated in the message for areas within a distance of radius R1, those within a distance of radius R2, and so forth. In this case, the warning device 11 need only decode the GPS coordinates of the center of the dangerous situation, and by comparing those coordinates with its own coordinates, determine the distance between the warning device 11 and the center of the dangerous occurrence. That distance will define the particular concentric area of FIG. 5 within which the warning device 11 is located, and thus define the appropriate danger index for that warning device.

The extension of the circular warning areas with sector divisions as shown in FIG. 6 permits a further refinement of the circular area of FIG. 5 by defining both the distance from the center of the dangerous situation and the particular angular sector in which the warning device 11 may be located. In this case, the messages of FIG. 9 may define danger indices for different sectors of the concentric rings of FIG. 6 by simply specifying the distance from the center of the dangerous situation and the danger index associated with the particular angular sectors located at that distance.

Danger Detection/Surveillance Satellites, Aircraft, Drones

Figure 10:
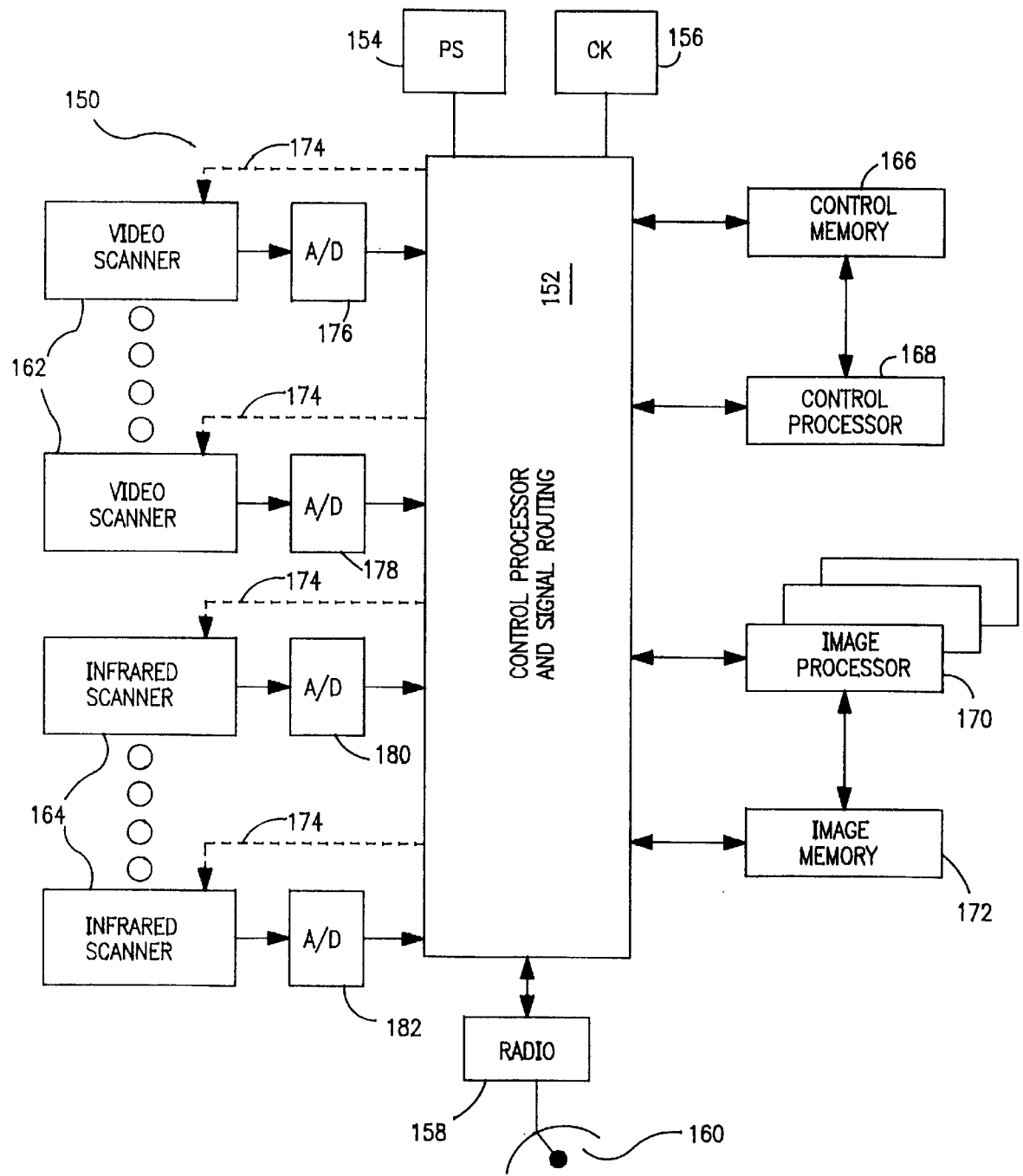
FIG. 10 is a block diagram of a danger detection surveillance satellite or aircraft configuration.

FIG. 10 illustrates a configuration 150 of a danger detection satellite such as surveillance satellite 8 in FIG. 1. The same configuration would also apply to surveillance aircraft/pilotless-drones 10 such as shown in FIG. 1. Manned surveillance configurations would also include audio command and response links not shown in FIG. 10. The configuration of FIG. 10 includes a control processor and signal routing circuit 152 used to control communications and switching between the various elements of the surveillance scanning and communication system. The control processor and signal routing circuit 152 is connected to power supply 154 and to clock circuit 156 from which it derives accurate timing. Radio 158 is used to transmit and receive signals via antenna 160 to the warning/command control center 2 of FIG. 1. The danger detection satellite configuration 150 includes video scanners 162 operated via control lines 174 from the control processing and signal routing circuit 152. Video scanning signals are converted from analog to digital form by analog/digital convertors 176 and 178 using conventional and well known techniques.

In addition to the video scanners 162, the danger detection satellite configuration 150 includes infrared scanners 164 likewise controlled by control circuits 174 from the control processor and signal routing circuitry 152. In a similar manner to that for the video scanners described above, the infrared scanner signals are converted from analog to digital form via analog-to-digital convertors 180 and 182 as illustrated in FIG. 10. In addition to the control processor and signal routing circuit 152, control processor 168 is used to control communications from the surveillance satellite with the ground station via radio 158 and antenna 160. The control processor also receives control commands from the ground station, decodes those commands, and generates control signals for the video scanners 162 and the infrared scanners 164. Control memory 166 is used with control processor 168 for storage of program and control information necessary for operation for the overall scanning and surveillance system.

FIG. 10 also illustrates the use of image processors 170 which may be implemented using neural networks or other specialized image processing architectures including high speed vector processors and parallel processing systems. The image processors 170 are connected to image memory 172 wherein information from video and infrared scanners is stored prior to processing by the image processor 170. Intermediate results from image processors 170 may also be stored in image memory 172 depending upon the image processing and analysis algorithms implemented. The results of the image processing are transmitted under control of control processor 168 to the warning/command control center 2 of FIG. 2. Entire images may be transmitted or only images that have been analyzed and for which there is concern that a dangerous situation may exist as determined by image processor 170. Image signals from the video scanners 162 and infrared scanners 164 may also be directly transmitted via radio 158 and antenna 160 to the ground station without the use of image processor 170. When appropriate, image processor 170 may be able to conserve bandwidth on down link 22 to warning/command control center 2 of FIG. 1, permitting more comprehensive scanning and transmission only of signals for which it has been determined that a dangerous situation may exist.

Emergency Response/Dispatch Services

Figure 11:
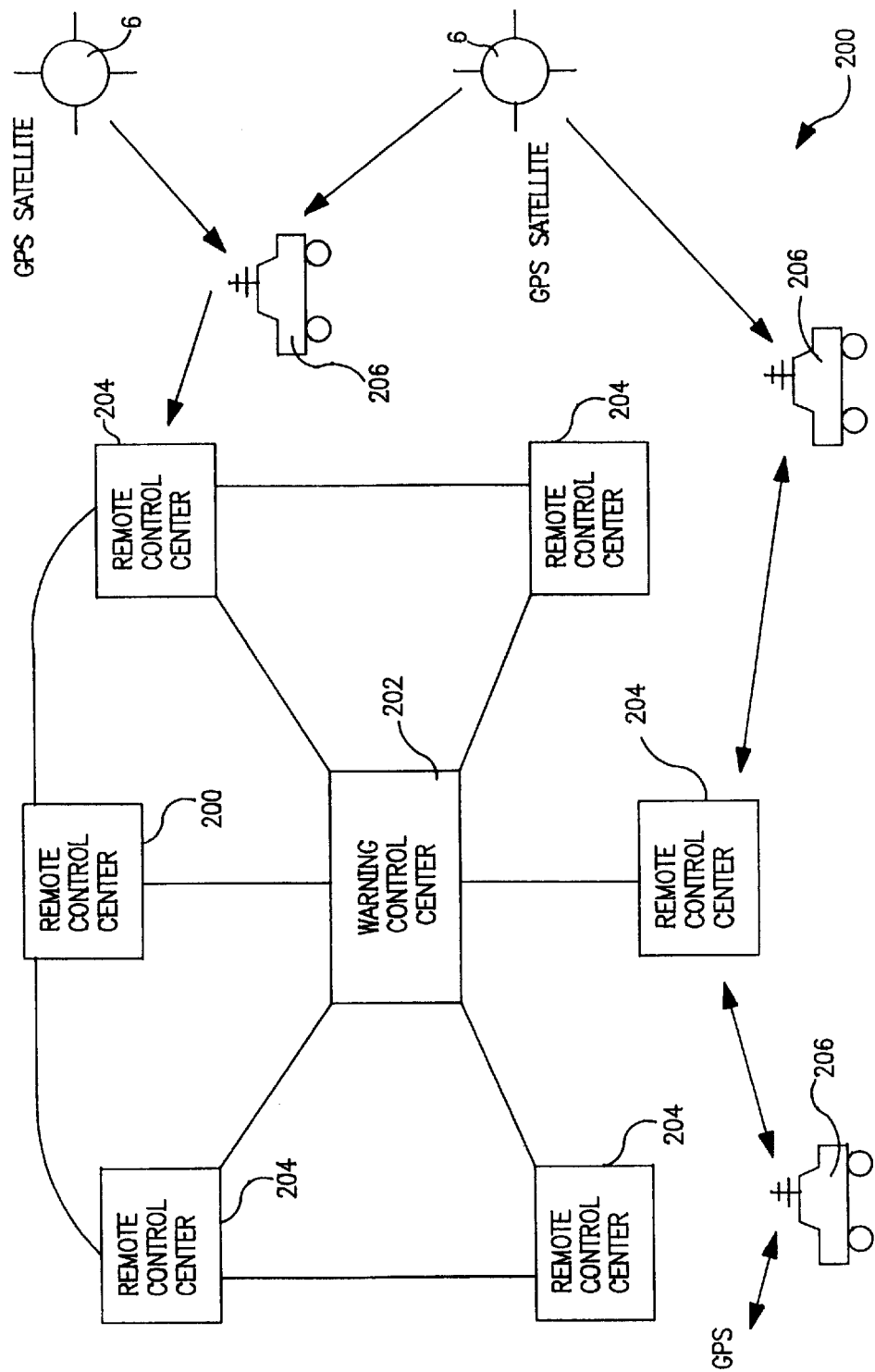
FIG. 11 illustrates an emergency warning/response dispatch system making use of information generated using the inventions herein disclosed.

FIG. 11 illustrates an emergency response/dispatch system and method useful in the present inventions. In FIG. 11, the warning control center 202 may be integrated with the warning/command control center 2 of FIG. 1, or, in fact, may be separate and communicate via radio or wireline or wireless links with the warning/command control center 2. The warning control center 202 is used to dispatch and control emergency response services to assist in alleviating the dangerous situation. Such services might include fire fighting equipment, police forces, military forces, medical emergency units, or any other emergency service personnel and/or equipment. The location of such equipment indicated via vehicles 206 in FIG. 11 is accurately known via GPS satellite 6 using conventional and known techniques. The warning control center 202 communicates with remote control centers 204 which may be dispersed over widely separated geographic areas and used for control and dispatch of emergency services, personnel and equipment located on a regional basis. The remote control centers in-turn transmit dispatch signals and communicate with the emergency response and disaster assistance personnel and equipment 206 as illustrated in FIG. 11. The remote control centers may also communicate with each other to further facilitate the most efficient dispatching of emergency response of systems.

In addition to operation based on communications to and from the warning/command control center 2 of FIG. 1, the warning control center or remote control centers of FIG. 11 also will receive the broadcast danger index messages 140 indicated in FIG. 9. Using this information, each of the remote controls centers will be able to immediately decode broadcast messages indicating dangerous situations within the region for which they have dispatch responsibility. This immediate access to the broadcast danger index messages 140 of FIG. 9 can be of great assistance in facilitating proper dispatch of emergency assistance. Likewise, the emergency equipment 206 of FIG. 11 will receive the broadcast danger index messages of FIG. 9, and also will have direct decode capability, further facilitating rapid dissemination of information relative to dangerous situations and thus insuring the most timely response possible from emergency assistance personnel and equipment.

Neural Computing Networks and Image Processing

Figure 12:
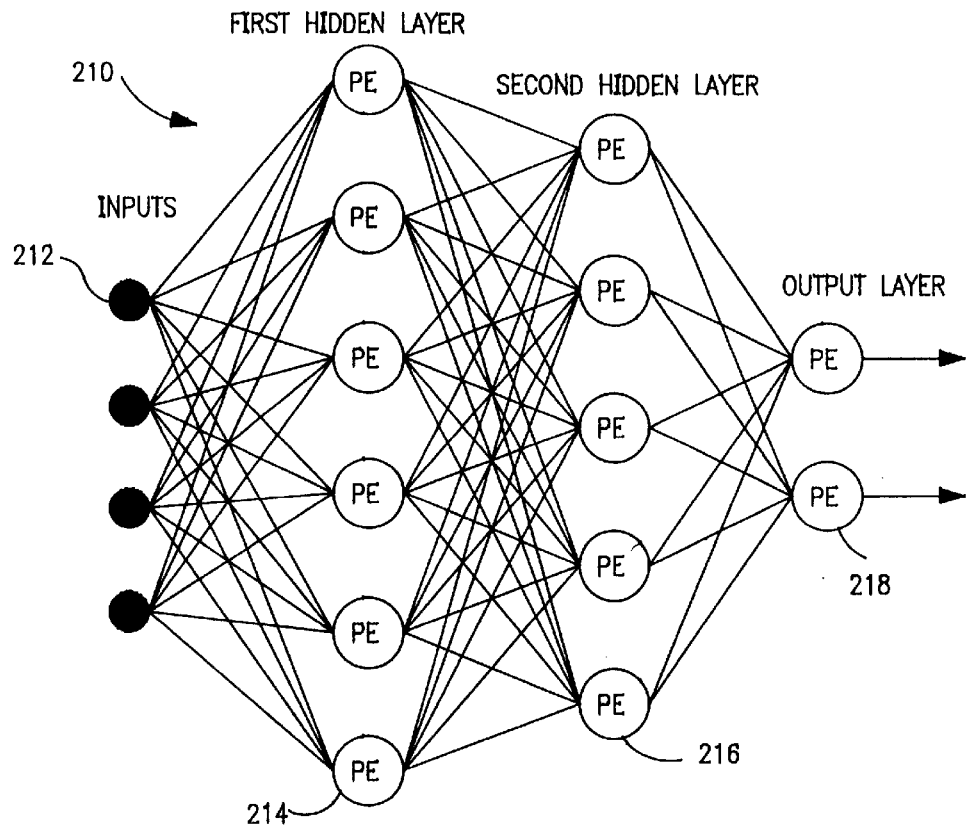
FIG. 12 is a diagram illustrating a structure of a neural network useful in analyzing image and/or other surveillance information to derive information characterizing dangerous situations.

Shown in FIG. 12 is one embodiment of a neural computing network having processing elements suitable for performing successive computations on image and other data derived from scanning and surveillance. Such neural computing networks are used to carry out the image processing in the computers 104 of FIG. 8 and 170 of FIG. 10. The neural network of FIG. 12 includes multiple processing elements 214 and 216 configured in layered structures. The processing elements (PE's) map input signal vectors to the output decision layer, performing such tasks as image recognition and image parameter analysis. Although the layered structure of FIG. 12 is shown as the preferred embodiment, it is noted that any appropriate neural network computer processing configuration can be substituted.

Figure 13:
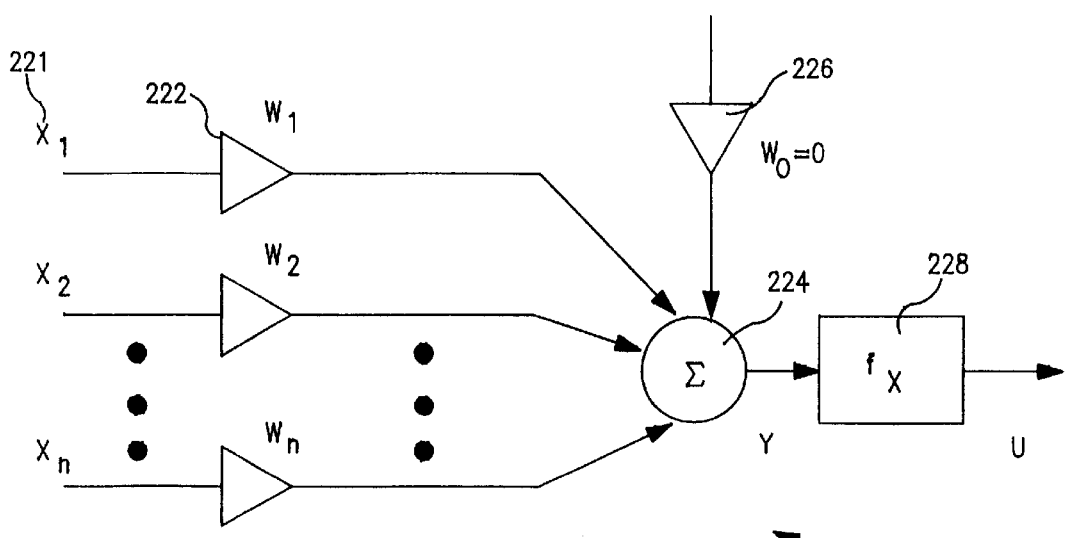
FIG. 13 illustrates the structure of a processing element in the neural network of FIG. 12.

A typical neural network processing element or circuit is shown in FIG. 13. Input vectors 221 (identified as X1, X2, ... Xn) are connected via weighing elements 222 (identified as W1, W2 ... Wn) to a summing node 224. The output of node 224 is passed through a non-linear processing element 228 to produce an output signal U. Offset or bias inputs can be added to the inputs through a weighing circuit 226 (identified as Wo). The non-linear function 228 is preferably a continuous, differentiable function, such as a sigmoid, which is typically used in neural network processing element nodes.

In accordance with standard expert system and neural network programming techniques, the neural networks used in the danger detection system of the invention are trained to continuously analyze various types of image data to recognize, quantize and characterize such images throughout the surveillance operations. Training the network involves providing known inputs to the network resulting in desired output responses. The weights are automatically adjusted based on error signal measurements until the desired outputs are generated. Various learning algorithms may be applied. Adaptive operation is also possible with on-line adjustment of network weights to meet imaging requirements.

The neural network configuration of the image analysis computers of FIGS. 8 and 10 is preferably implemented in a highly parallel image processing structure, enabling rapid image analysis and recognition necessary for optimizing danger detection and decision making real time message dispatch decisions. Very Large Scale Integrated (VLSI) circuit implementations of the neural processing elements provide a relatively low cost but highly reliable system important to a warning and automatic dispatch system of the type herein disclosed. In particular, loss of any one processing element does not necessarily result in a processing system failure.

Figure 14:
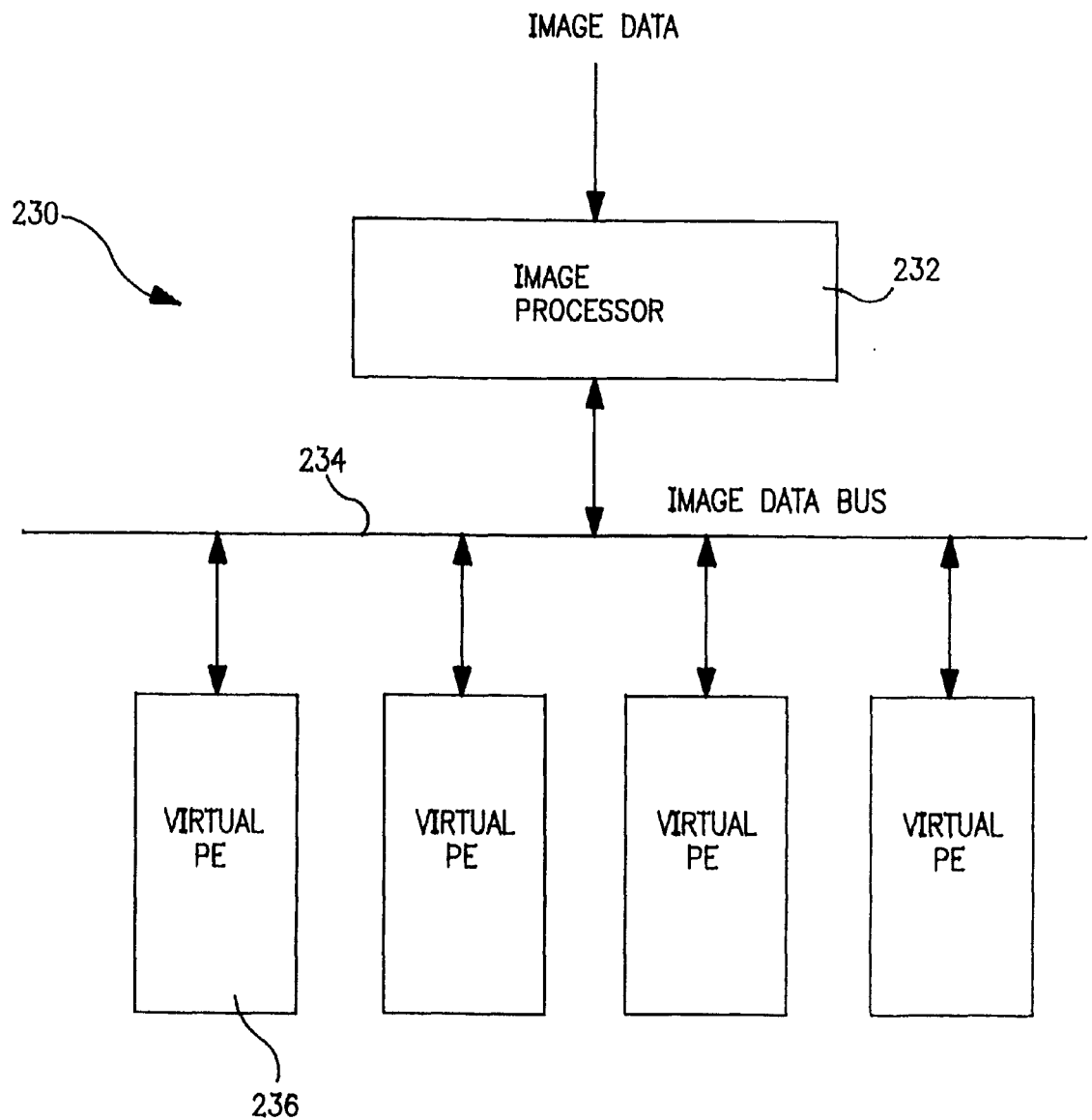
FIG. 14 illustrates an alternate embodiment of the neural network analysis processor.

The above described programming techniques are well know to those of ordinary skill in the art, as discussed in the various references incorporated by reference above, and accordingly, are not repeated in detail here. Other processing implementations can be substituted. For example, in the alternate embodiment shown in FIG. 14, the neural computing network is implemented with multiple virtual processing elements 236 coupled to an image processor 232. Image data is presented to the image processor 232 over date bus 234 and is routed to selected virtual processing elements 236, which implement the neural network computing functions. The virtual processing elements 236 may comprise pipe-lined processors to increase the overall speed and computational efficiency of the system.

Expert Knowledge Systems and Fuzzy Logic

The herein disclosed danger warning and emergency response dispatch systems and methods are based on the generation of danger indices indicating the degree of danger in various geographical areas. The factors involved in making such computations are many and complex requiring a structured and logical approach in organizing large amounts of data and information, and from that information generating danger indices indicative of actual dangers in different areas based upon multiple inputs from surveillance scanning systems and from database computers. Problems of this type generally benefit from the use of expert system technology with preprogrammed decision rules based upon expert experience reflecting proper response to various situations. Various such expert system approaches are possible and may be used in the danger warning and emergency response dispatch systems and methods herein disclosed. Indeed, it is the intent that the invention herein described not be limited to any particular data analysis and organization methods. However, a particularly attractive method, and one which demonstrates the interrelationship of the various variables and the logical operations necessary to generate the desired danger indices and corresponding control and dispatch messages is that of fuzzy logic. The complexities and range of options in the danger warning system herein described makes fuzzy logic an ideal methodology to optimize the warning and dispatch process by monitoring and analyzing the various sensor outputs according to properly weighted parameters.

The fuzzy logic controllers execute fuzzy logic inference rules from a fuzzy rule base. Input and output variables are defined as members of fuzzy sets with degrees of membership in the respective fuzzy sets determined by specified membership functions. The rule base defines the fuzzy inference system and is based on expert knowledge for system control based on observed values of the control variables. The input data defines the membership functions used in the fuzzy rules. The reasoning mechanism executes the fuzzy inference rules, converting the input data to output control values using the data base membership functions.

A preferred embodiment of the fuzzy logic controller disclosed herein is based on a fuzzy reasoning system using input variables corresponding to at least distance from the danger, area vulnerability, and the relative velocity with which the danger is approaching the area. The fuzzy logic inference system generates output signals that indicate danger indices for each of the areas of concern. The preferred embodiment of the fuzzy logic controller is implemented using trapezoidal fuzzy membership functions as shown in FIGS. 15A through 15D. Other membership functions (MF's) are possible including: (1) Triangular MF's, (2) Gaussian MF's, (3) Generalized Bell MF's, and (4) Sigmoidal MF's, and can easily be substituted for the trapezoidal fuzzy membership functions.

The rule base for the danger warning and emergency response system and method disclosed herein is formulated with "IF . . . THEN . . . " structures representing the linguistic expression of the logical elements involved in the fuzzy logic rule base. As shown in FIG. 15, the triangular membership functions include overlapping membership ranges for the following variable ranges:

DISTANCE: VERY CLOSE, CLOSE, MODERATE, FAR, VERY FAR

VULNERABILITY: VERY LOW, LOW, NORMAL HIGH, VERY HIGH

RELATIVE VELOCITY: LOW, MODERATE, HIGH

DANGER INDEX: VERY LOW, LOW, MEDIUM, HIGH, VERY HIGH

Figure 15A:
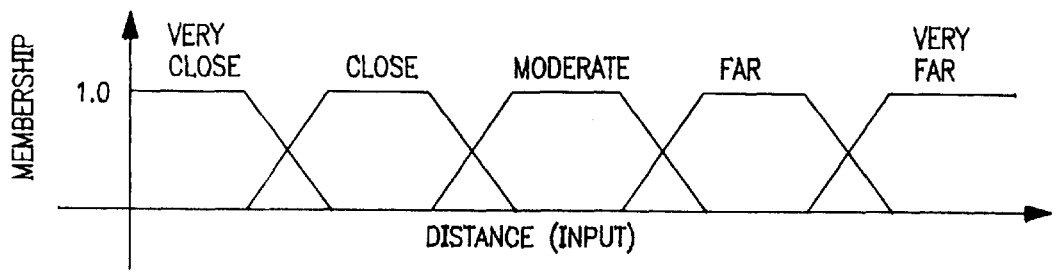
FIG. 15 illustrates an example of fuzzy logic membership functions for various parameters useful in evaluating a danger index using fuzzy logic inference rules.

To better understand the fuzzy logic compositional rules applied to the fuzzy danger warning and emergency response system and method herein disclosed, consider first just the Distance variable shown in FIG. 15A. The fuzzy set corresponding to "Very Close Distances" {DVC} is the set of all distances D between zero and the upper distance DVCu defined for very close distances. Similarly, the fuzzy set corresponding to close distances {DC} is the set of all distances between the lowest defined close distance DCl and the upper close distance DCu. Because of the "fuzzy" definitions of "very close" and "close", it will be true that DCl <DVCu, and the fuzzy sets will overlap. Similarly, overlap occurs between the other defined distance ranges.

The nature of the overlapping membership functions for several of the variables involved in the disclosed danger warning and emergency response system and method is illustrated in FIG. 15A through 15D. Similar relationships would exist for other variables not shown.

In the fuzzy logic implementation, the three input variables (distance, vulnerability, and relative velocity) are used to compute the danger index with the corresponding membership functions indicated in FIG. 15. Example danger index fuzzy logic inference rules are shown in FIG. 16.

In the example rule set shown in FIG. 16, twenty-five fuzzy logic inference rules are indicated for each of the three values of relative velocity: Low, Moderate, and High. A total of 75 rules are indicated. For each of the values of relative velocity, various combinations of vulnerability and distance are indicated. In each of the three matrices, the distance variables are indicated in the five columns while the vulnerability indices are indicated in the rows of the matrices. For example, reading from FIG. 16:

IF Relative Velocity=Low, and Distance=Close and Vulnerability Low, THEN Danger Index=Medium.

IF Relative Velocity=Moderate, and Distance=Very Close and Vulnerability=High, THEN Danger Index=Very High.

IF Relative Velocity=High, and Distance=Far and Vulnerability=Very High, THEN Danger Index=High.

It should be understood that different rules would exist if different parameters and data were considered. The examples given here are only meant to be illustrative of the possibility of organizing the information necessary to generate the danger index and dispatch control messages using fuzzy logic principles.

Figure 15B:
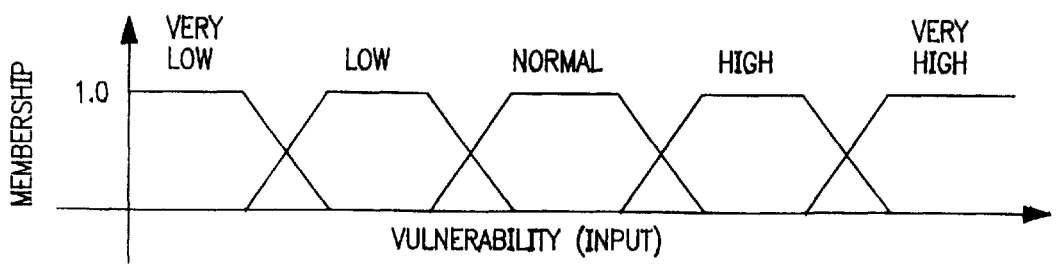
Figure 15C:
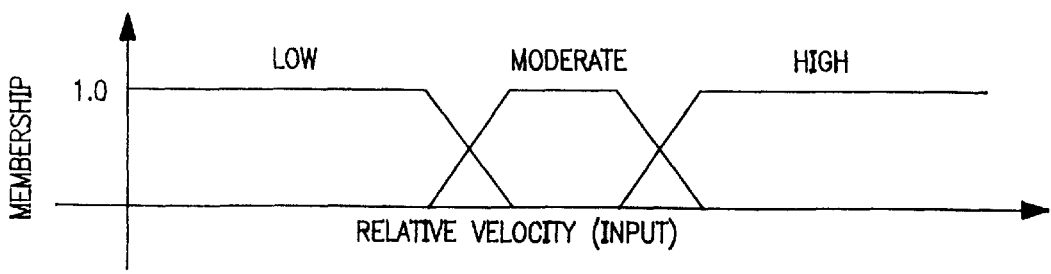
Figure 15D:
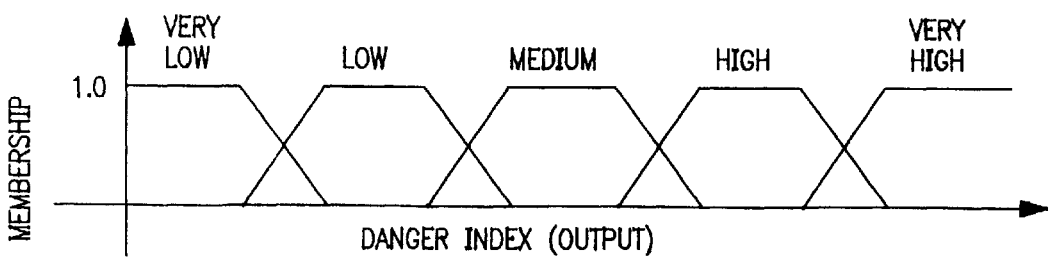

Because of the overlapping nature of the input variables as indicated in the membership functions of FIGS. 15A, 15B, 15C and for the danger index as indicated in FIG. 15D, multiples of the fuzzy logic inference rules of FIG. 16 may be "fired" for given discrete values of the input variables. The fuzzy logic inference rules of FIG. 15 are structured using the input value for each of the input variables combined with logical "AND" operators. Standard fuzzy logic methods, are used to derive the correct value of the output danger index.

Figure 17:
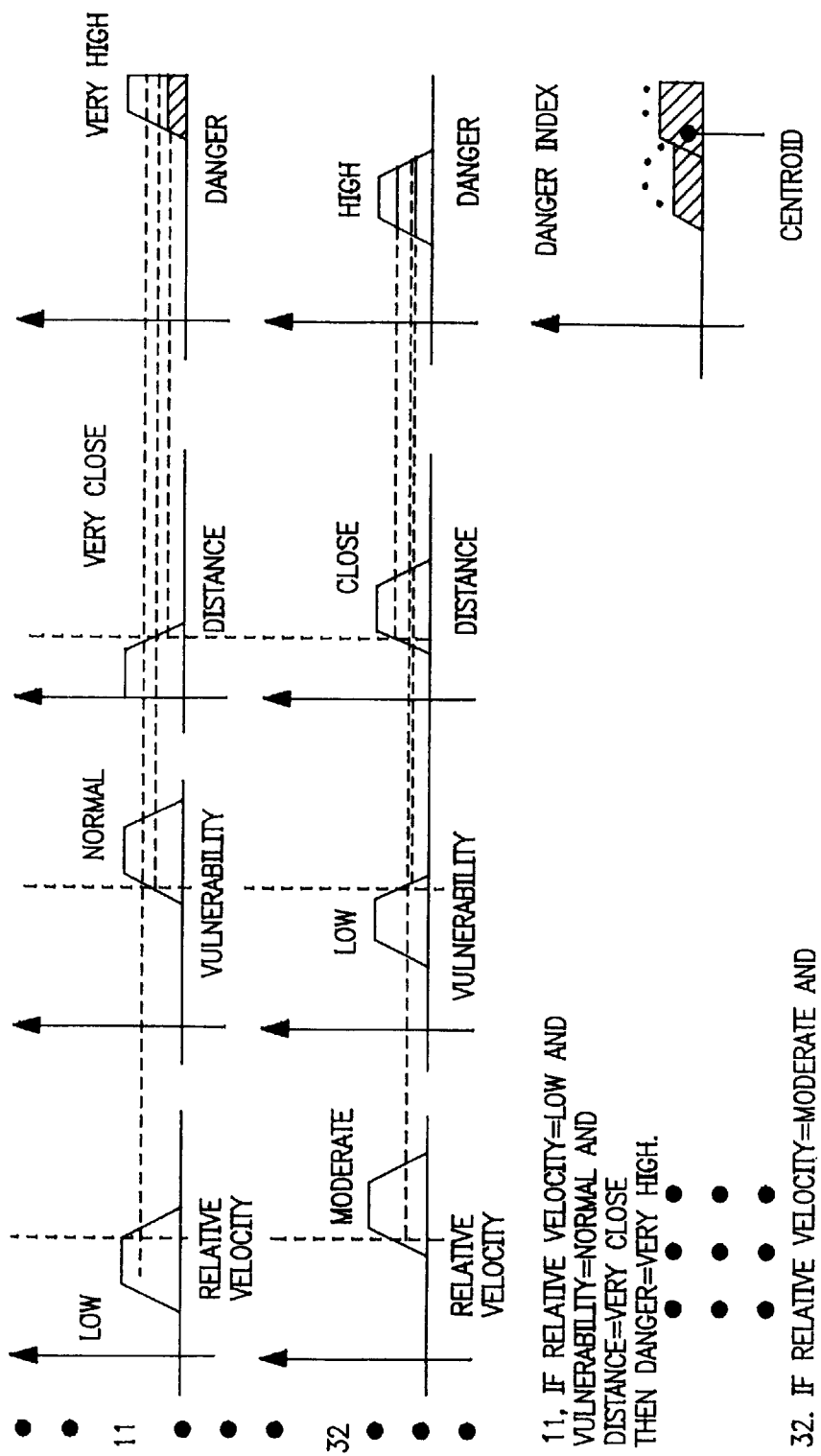
FIG. 17 is an example of fuzzy logic danger index calculations indicating graphically the manner in which such calculations are made using a multiplicity of fuzzy logic variables.

An example calculation using these input variables is illustrated in FIG. 17. Using fuzzy logic principles, the danger index for each combination of input variables is calculated as corresponding to the minimum membership for each of those variables. As shown in row 1 of FIG. 17, for the indicated values of relative velocity, vulnerability and distance, the membership for distance is the minimum of the three which would be the corresponding membership for the very high danger index. Similarly, in the second row of FIG. 17 the minimum membership corresponds to the vulnerability factor, which determines the membership in the high range for the danger index. This figure illustrates just two of the multiple fuzzy logic inference rules fired by the indicated variable fuzzy membership grade. The discrete value for the danger index can be calculated using the centroid method as indicated in FIG. 17, or other appropriate defuzzification algorithms.

FIG. 18 indicates an area danger index matrix computed with the above described methods. An index Dij is calculated for each area being surveyed by the surveillance mechanisms herein above disclosed. It is these danger indices that are transmitted via the broadcast danger index messages of FIG. 9. In the case of the rectangular grid of FIG. 2, a danger index is computed for each of the indicated rectangular sections using the fuzzy logic inference principles described above. In the case of circular warning areas with sector divisions as shown in FIG. 6, danger indices would be computed for each of the indicated areas such as area A32 indicated in FIG. 6.

An area value matrix is indicated in FIG. 19 with the values Vij representing values of respective regions or areas being scanned. Once again, in the case of a rectangular array, a value index would be used for each of the rectangular subareas. Similarly, in the case of the circular areas with sector divisions as shown in FIG. 6, a value would be determined for each of the circular subareas. The values in the matrix 252 may reflect the presence of high population densities, very valuable properties, or valuable natural resources. Separate value matrices may be obtained for valuable objects, property or persons in particular areas to be surveyed. The particular numerical values in the value matrix may be stored, for example, in the database storage 122 of FIG. 8.

Using a combination of the values in the area danger index matrix 250 of FIG. 18 and the value matrix 252 of FIG. 19, an area priority matrix 254 may be computed as shown in FIG. 20. This matrix may be of assistance in dispatching emergency assistance personnel and resources in a manner that depends on both the danger and the value of the personnel or objects present in each of the areas. For example, one area may have a high danger index, but with no population and/or very little valuable assets contained therein. In such an instance, it may be wiser to dispatch emergency assistance to other areas that may have a lower danger index but have a higher priority based on the value of the contents of the area. With this type of calculation, danger indices and priority indices may be transmitted via the broadcast emergency message transmitting system indicating the degree of danger to the persons or objects located in each individual area, and also prioritizing those areas which should first receive emergency assistance based on the value of the contents of particular areas.

Figure 21:
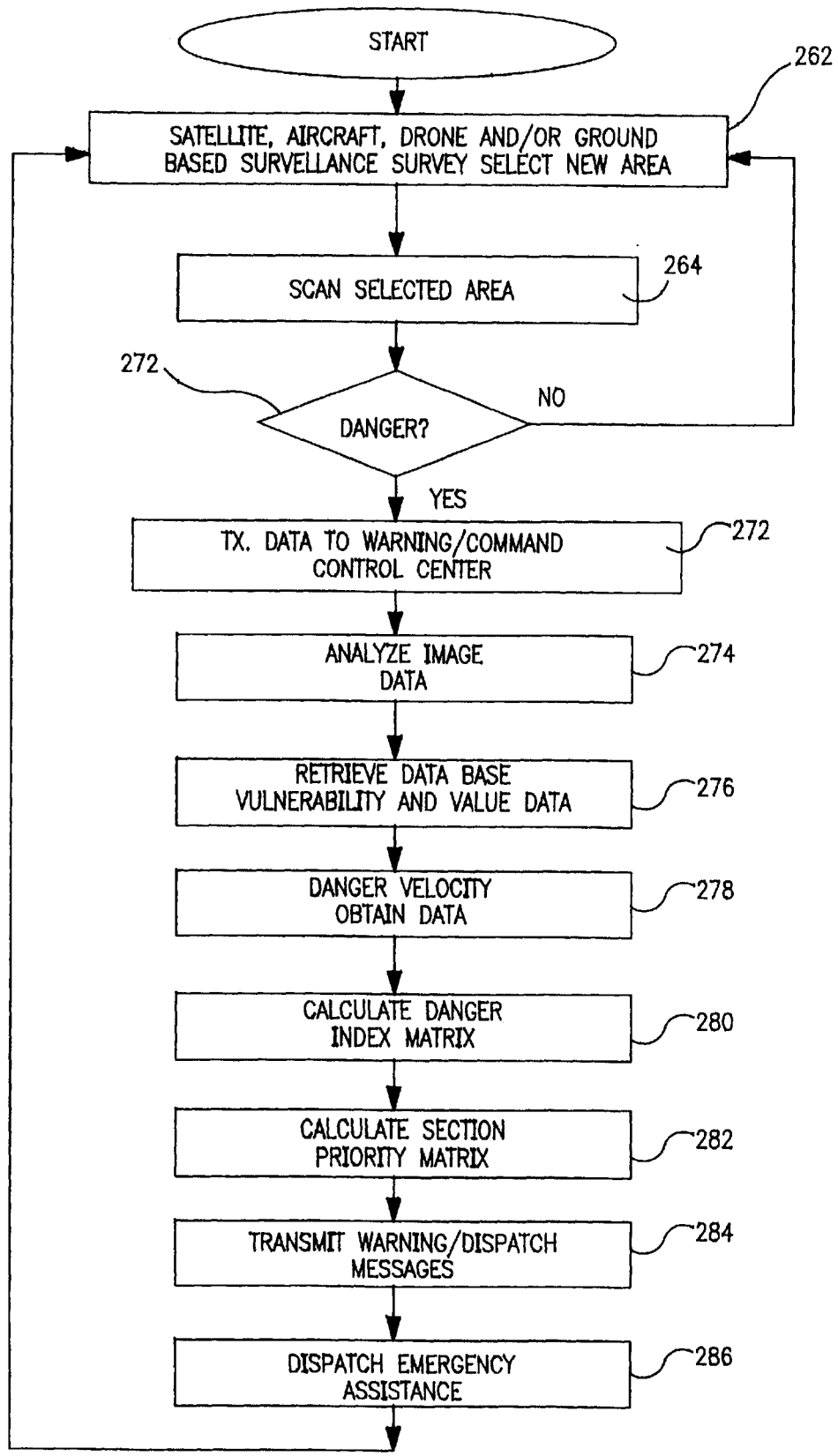
FIG. 21 is a danger warning dispatch/process flow diagram.

FIG. 21 is a generalized, overall flow diagram for the danger warning and emergency dispatch message systems and methods herein disclosed. As indicated in FIG. 21, input data may come from satellite/aircraft/pilotless drones or from ground based surveillance systems as indicated in FIG. 1. Continual monitoring occurs for dangerous situations in block 264. If danger is detected, danger test 270 passes control to the warning command control center by transmitting appropriate data as indicated in control block 272 of FIG. 21. The received data is analyzed in block 274 using the techniques and methods disclosed herein above. Information is retrieved from the database indicating the vulnerability of particular areas and the value of persons and/or other objects that may be present in each individual area in block 276. Based on successively received indications of danger, the relative velocity of the dangerous situation in any given direction is calculated in block 278. Using the above described information, the danger index matrix is calculated in block 280 of FIG. 21. If appropriate, the priority matrix described above is calculated in block 282 based on the value of personnel and/or assets in each individual area. Warning and dispatch messages are transmitted in block 284 via the broadcast network. Emergency assistance is dispatched in block 286 of FIG. 21.

A further embodiment of the present invention includes an earth scanning system and method employing a plurality of earth scanning platforms, including a plurality of earth satellites 8 and a plurality of pilotless drone aircraft 10, each of which platforms supports one or more electronic (e.g. television) cameras. Two-way communications 22a between computing systems in the satellites 8 and computing systems in the drones 10 of the system are effected to maximize system detection and efficiency. The method also employs artificial intelligence including neural networks and fuzzy logic ware, including software and electronics hardware, to control data transfer, scanning by both the satellite 8 and drone mounted scanning (television) systems 10, and control of the flight path(s) of the scanning pilotless aircraft or drones 10.

A still further embodiment of the present invention includes a planet earth surveillance system and method for scanning select portions of the earth and computer analyzing the surveillance or scanning signals to detect variables in planet earth, wherein a plurality of moving aerial platforms including pilotless drones 10 and earth satellites 8 are employed, improvements are provided in communicating 22a between and control of the surveillance platforms 8,10 in their movements and/or their scanning of the earth. In one form, a plurality of geo-synchronized earth satellites 8 can select a portion of the earth's surface which selected portion is also scanned by a plurality of pilotless drones 10 wherein one or more of such drones is controlled by signals from either the satellites 8,22a and/or from a master computer on the ground 2,24 which includes a computerized image analysis system for the satellite and drone scanning system. Satellite scanning operations are also controlled by such computer at least partly as a result of the results of computerized analysis of the image signals generated by the satellites and drone aircraft earth scanning system.

The inventions set forth above are subject to many modifications and changes without departing from the spirit, scope or essential characteristics thereof. Thus the embodiments explained above should be considered in all respect as being illustrative rather than restrictive of the scope of the inventions as defined in the appended claims. For example, the scanning and surveillance operations may be carried out using a wide variety of sensing equipments. Similarly the various computing operations described herein may very depending upon the particular computer structures and algorithmic approaches selected.

What is claimed is:

1. A method of providing an automated, wide area, danger warning and emergency response comprising the steps of:
   (a) detecting a dangerous situation from a detection location,
   (b) transmitting information signals describing the dangerous situation from the detection location via radio transmission signals to a control center for analysis,
   analyzing the received information signals in the control center in computer systems employing expert system technology,
   (d) determining in the control center the degree of danger and its geographic extent based on analysis of the received information signals,
   (e) generating in the control center a danger warning and emergency response including a danger index indicating a degree of danger within at least one geographic area,
   (f) broadcasting the danger warning and emergency response from the control center to a plurality of remotely located warning devices each of which has a GPS receiver and the ability to calculate its own location in GPS coordinates,
   (g) receiving via the broadcast signals the danger warning and emergency response in the remotely located warning devices, and comparing in each remotely located warning device the coordinates of the dangerous situation with its own GPS coordinates for determining the extent to which each remotely located warning device is in danger, and
   (h) automatically issuing from each remotely located warning device a warning corresponding to the extent to which the issuing remotely located warning device is in danger.

2. The method of claim 1 wherein the detecting step further comprises the step of:
   surveying the earth from at least one surveillance platform.

3. The method of claim 2 wherein the surveying step further comprises the step of:
   surveying the earth from a satellite.

4. The method of claim 2 wherein the surveying step further comprises the step of:
   surveying the earth from an airborne craft.

5. The method of claim 2 wherein the surveying step further comprises the step of:
   surveying the earth from a balloon.

6. The method of claim 2 wherein the surveying step further comprises the step of:
   surveying the earth from a ground based mobile unit or vehicle.

7. The method of claim 2 wherein the surveying step further comprises the step of:
   surveying the earth from a stationary structure.

8. The method of claim 2 wherein the surveying step further comprises the step of:
   surveying the earth with equipment or personnel supported on the platform.

9. The method of claim 8 wherein the step of surveying the earth with equipment or personnel supported on the platform further comprises the step of:
   surveying with a video scanning camera.

10. The method of claim 8 wherein the step of surveying the earth with equipment or personnel supported on the platform further comprises the step of:
    surveying with an infrared scanner.

11. The method of claim 8 wherein the step of surveying the earth with equipment or personnel supported on the platform further comprises the step of:
    surveying with a chemical detector.

12. The method of claim 8 wherein the step of surveying the earth with equipment or personnel supported on the platform further comprises the step of:
    surveying with an infrared detector or sensor.

13. The method of claim 8 wherein the step of surveying the earth with equipment or personnel supported on the platform further comprises the step of:
    surveying with an image or surveillance signal analyzer.

14. The method of claim 8 wherein the step of surveying the earth with equipment or personnel supported on the platform further comprises the step of:
    surveying using a neural network.

15. The method of claim 8 wherein the step of surveying the earth with equipment or personnel supported on the platform further comprises the step of:

surveying with a high speed vector processor or parallel processing system.

16. The method of claim 8 wherein the step of surveying the earth with equipment or personnel supported on the platform further comprises the step of:

surveying using a human surveyor.

17. The method of claim 2 wherein the surveying from a platform step further comprises the steps of:

surveying from one or more platforms each having a GPS receiver, determining the GPS coordinates of each surveillance platform, and estimating the GPS coordinates of the detected danger when offset therefrom.

18. The method of claim 1 wherein the broadcasting step further comprises the step of:

transmitting GPS coordinates of the surveillance platform.

19. The method of claim 1 wherein the analyzing by employing expert system technology step further comprises the step of:

analyzing by employing fuzzy logic and fuzzy inference rules.

20. The method of claim 1 wherein the step of analyzing by employing expert system technology further comprises the step of:

using expert knowledge database retrieval and relating the stored database information to the type of danger and the location of dangerous situations.

21. The method of claim 1 wherein the determining step further comprises the step of:

defining the geographic extent in GPS coordinates.

22. The method of claim 1 wherein the determining step further comprises the step of:

defining the geographic extent as bounded be the radii of two circles centered on a dangerous situation whose center is defined by GPS coordinates.

23. The method of claim 22 wherein the defining step further comprises the step of:

further defining the geographic extent as bounded by angular sectors between the radii.

24. The method of claim 1 wherein the step of indicating a degree of danger further comprises the step of:

deriving a danger index from a defined parameter.

25. The method of claim 24 wherein the deriving from a defined parameter step further comprises the step of:

deriving a danger index from the distance between the dangerous situation and a particular warning device.

26. The method of claim 24 wherein the deriving from a defined parameter step further comprises the step of:

deriving a danger index from the rate at which the dangerous situation may be approaching a particular warning device.

27. The method of claim 24 wherein the deriving from a defined parameter step further comprises the step of:

deriving a danger index from the vulnerability of a person or property associated with a particular warning device to a particular dangerous situation.

28. The method of claim 24 wherein the deriving from a defined parameter step further comprises the step of:

deriving a danger index from the type of a particular dangerous situation.

29. The method of claim 1 wherein the generating step further includes the step of:

defining a vulnerability index for a particular area depending upon the presence of a particular structure, natural resource, or population density of the area.

30. The method of claim 1 wherein the generating step further comprises the step of:

establishing an emergency response dispatch priority using vulnerability factors characterizing different geographic regions.

31. The method of claim 30 wherein the dispatch priority establishing step further comprises the step of:

analyzing the vulnerability of a particular structure to one type of a dangerous situation and the vulnerability of people to another type of dangerous situation.

32. The method of claim 1 wherein the generating step further comprises the step of:

displaying in the control center the results of the surveillance and analysis of signals received from the surveillance platforms to alert an operator thereof of the dangerous situation in the surveyed region.

33. The method of claim 1 wherein the generating step further comprises the step of:

alerting the operator of the control center with warning sounds representative of signals received from the surveillance platform indicative of the dangerous situation in the surveyed region.

34. The method of claim 1 wherein the generating step further comprises the step of:

communicating to an operator of the control center the results of the surveillance and analysis of signals received from the surveillance platforms to alert the operator to the dangerous situation in the surveyed region.

35. The method of claim 1 wherein the broadcasting step further comprises the step of:

transmitting the danger warning and emergency response via a radio link to a pager satellite network and then to the warning device.

36. The method of claim 1 wherein the broadcasting step further comprises the step of:

transmitting the danger warning and emergency response via a radio link to a ground based pager network and then to the warning device.

37. The method of claim 1 wherein the broadcasting step further comprises the step of:

transmitting the danger warning and emergency response via a radio link to a ground based broadcast network and then to the warning device.

38. The method of claim 1 wherein the broadcasting step further comprises the step of:

transmitting messages containing a plurality of danger indices and geographic coordinates identifying the regions corresponding to each danger index.

39. The method of claim 1 wherein the generating and broadcasting steps further comprise the steps of:

generating and broadcasting synthetic speech describing a plurality of danger indices and geographic coordinates identifying regions corresponding to each danger index.

40. The method of claim 1 wherein the broadcasting step further comprises the step of:

identifying predefined danger emergency warning areas and a danger index for each such area relative to an identified dangerous situation.

41. The method of claim 1 wherein the broadcasting step further comprises the step of:

broadcasting to remote warning devices located on persons, in mobile land vehicles, in airborne craft, on vessels at sea, or in stationary structures.

42. The method of claim 1 wherein the comparing step further comprises the step of:

comparing the GPS coordinates of the dangerous situation.

43. The method of claim 1 further comprising the step of:

determining that the remotely located warning device is located within the geographic area defined by the GPS coordinates of the dangerous situation, and, then, activating warning signals indicating the degree of danger which was communicated via the danger index in the received signals.

44. The method of claim 43 wherein the activating step further comprises the step of:

depending upon the location of the remotely located warning device, different degrees of danger existing relative to the nature of the dangerous situation as indicated by the received broadcast signals, and if the remotely located warning device be located within a geographic area defined as having a very high danger, then that device indicating via an audible, visual, vibratory or other warning device the existence of a very dangerous situation.

45. The method of claim 43 wherein the activating step further comprises the step of:

depending upon the location of the remotely located warning device, different degrees of danger existing relative to the nature of the dangerous situation as indicated by the received broadcast signals, and if the warning device be located in an area adjacent to a very dangerous situation, then that device indicating via an audible, visual, vibratory or other warning device the existence of a less than very dangerous situation.

46. The method of claim 1 further comprising the step of:

receiving the danger warning and emergency response in a remote control center which dispatches and controls emergency response services to assist in alleviating the dangerous situation.

47. The method of claim 1 further comprising the step of:

dispatching emergency services based on a priority index derived from both danger and value indices.

48. The method of claim 1 further comprising the step of:

controllably dispatching emergency services based on a priority index derived from both danger and value indices.

49. The method of claim 1 further comprising the step of:

receiving the broadcast danger warning and emergency response directly in emergency response vehicles manned by emergency personnel located in the most dangerous areas who, upon decoding the danger warning and emergency response will immediately know that they are in the proximity of the dangerous situation and may immediately respond accordingly.

50. The method of claim 49 further comprising the step of:

determining the locations of such emergency response vehicles or persons by using GPS technology.

51. The method of claim 1 wherein the broadcasting step further comprises the step of:

broadcasting the danger warning and emergency response via a conventional communication network.

52. The method of claim 51 wherein the broadcasting via a conventional communication network step further comprises the step of:

broadcasting via a television network.

53. The method of claim 51 wherein the broadcasting via a conventional communication network step further comprises the step of:

broadcasting via an AM/FM radio network.

54. The method of claim 51 wherein the broadcasting via a conventional communication network step further comprises the step of:

broadcasting via a cable network.

55. The method of claim 51 wherein the broadcasting via a conventional communication network step further comprises the step of:

broadcasting via a fiber optic network.

56. The method of claim 51 further comprising the step of:

receiving a danger index including geographic coordinates defining regions appropriate to each degree of danger corresponding to the geographic area in which the receiver is located indicating the degree of danger in which users located in particular areas may find themselves.

57. The method of claim 1 wherein the remotely located warning device is a television receiver further comprising the step of:

receiving on the television receiver the danger warning and emergency response and displaying on the display screen thereof an emergency message customized to the location of the television.

58. The method of claim 57 further comprising the step of:

identifying in the emergency message the danger and its position from the display screen based on information resulting from a comparison of electronic data from different sources occurring within the television receiver.

59. The method of claim 1 wherein the remotely located warning device is a radio receiver further comprising the step of:

receiving on the radio receiver the danger warning and emergency response and annunciating from the radio an emergency message customized to the location of the radio receiver.

60. The method of claim 59 further comprising the step of:

identifying in the emergency message the danger and its position from the radio annunciator based on information resulting from a comparison of electronic data from different sources occurring within the radio.

61. The method of claim 1 wherein the remotely located warning device is a receiver-computer further comprising the steps of:

receiving in the receiver the danger warning and emergency response and displaying on a display screen of the receiver-computer an emergency message customized to the location of the receiver-computer.

62. The method of claim 61 further comprising the step of:

identifying in the emergency message the danger and its position from the display screen based on information resulting from a comparison of electronic data from different sources occurring within the computer.

63. The method of providing an automated, danger warning and emergency response in a selected area of a plurality of areas worldwide comprising the steps of:

(a) detecting a dangerous situation from at least one of a plurality of surveillance locations or platforms worldwide, (b) transmitting first information signals modulated with information relating to the dangerous situation from the surveillance platform or location via radio transmission signals to a warning command control center for analysis, analyzing the first received information signals in the warning command control center in a computer system employing expert system technology, (d) determining at the warning command control center the degree of danger and its geographic extent based on analysis of the received information signals, (e) generating at the warning command control center a danger warning and emergency response including a danger index indicating a degree of danger within at least one geographic area, (f) broadcasting the danger warning and emergency response from the warning command control center to a plurality of remotely located information indicating devices in an area selected relative to the geographic area having the indicated degree of danger, (g) receiving via the broadcast signals the danger warning and emergency response in the remotely located information indicating devices, and comparing in each such remotely located information indicating device the coordinates of the dangerous situation with its own coordinates for determining the extent to which personnel near each remotely located information indicating device are in danger, and (h) automatically issuing from each remotely located information indicating device a warning corresponding to the extent to which the issuing remotely located information indicating device is in danger.

64. The method of providing an automated, danger warning and emergency response in a selected area of a plurality of areas nationwide comprising the steps of:

(a) detecting a dangerous situation from at least one of a plurality of surveillance locations or platforms nationwide, (b) transmitting first information signals modulated with information relating to the dangerous situation from the surveillance platform or location via radio transmission signals to a warning command control center for analysis, analyzing the first received information signals in the warning command control center in a computer system employing expert system technology, (d) determining at the warning command control center the degree of danger and its geographic extent based on analysis of the received information signals, (e) generating at the warning command control center a danger warning and emergency response including a danger index indicating a degree of danger within at least one geographic area, (f) broadcasting the danger warning and emergency response from the warning command control center to a plurality of remotely located information indicating devices in an area selected relative to the geographic area having the indicated degree of danger, (g) receiving via the broadcast signals the danger warning and emergency response in the remotely located information indicating devices, and comparing in each such remotely located information indicating device the coordinates of the dangerous situation with its own coordinates for determining the extent to which personnel near each remotely located information indicating device are in danger, and (h) automatically issuing from each remotely located information indicating device a warning corresponding to the extent to which the issuing remotely located information indicating device is in danger.

65. The method of claim 63 or 64 wherein the information indicating device is a television further comprising the step of:

a user programming the location coordinates of the television into the television receiver.

66. The method of claim 63 or 64 wherein the information indicating device is a television further comprising the step of:

deriving the location coordinates of the television from an internal GPS receiver-computer located in the television.

67. The method of claim 63 or 64 wherein the information indicating device is a television further comprising the step of:

determining the coordinates of the remotely located home television using a ranging device.

68. The method of claim 63 or 64 wherein the information indicating device is a television further comprising the step of:

determining the coordinates of the remotely located home television using a radio ranging system.

69. The method of claim 63 or 64 wherein the information indicating device is a television set further comprising the steps of:

receiving on the television set the danger warning and emergency response and displaying on the display screen of the television set an emergency message customized to the location of the television set.

70. The method of claim 69 further comprising the step of:

identifying in the emergency message displayed the danger and its position from the television screen.

71. The method of providing an automated, wide-area, danger warning and emergency response comprising the steps of:

(a) detecting a dangerous situation from a surveillance platform, (b) transmitting information signals describing the dangerous situation from the surveillance platform via radio transmission signals to a warning command control center, analyzing the received information signals at the warning command control center using a computer system employing expert system technology, (d) determining at the warning command control center the degree of danger and its geographic extent based on analysis of the received information signals, (e) generating at the warning command control center a danger warning and emergency response including a danger index indicating a degree of danger within at least one geographic area, (f) broadcasting the danger warning and emergency response from the warning command control center to a plurality of remotely located home radio receivers, (g) receiving via the broadcast signals the danger warning and emergency response at the remotely located home radio receivers, and comparing at each remotely located home radio receiver the area or earth coordinates of the dangerous situation with its own area coordinates for determining the extent to which each remotely located home radio receiver location is in danger, and (h) automatically issuing from each of a plurality of remotely located home radios a warning corresponding to the extent to which the issuing remotely located home radio is in danger.

72. The method of providing an automated, wide-area, danger warning and emergency response to multiple population areas comprising the steps of:

(a) detecting a dangerous situation from a plurality of surveillance platforms, (b) transmitting information signals describing the dangerous situation from the surveillance platform via radio transmission signals to a warning command control center, analyzing the received information signals at the warning command control center in a computer system employing expert system technology, (d) determining at the warning command control center the degree of danger and its geographic extent based on analysis of the received information signals, (e) generating at the warning command control center a danger warning and emergency response including a danger index indicating a degree of danger within multiple areas under surveillance, (f) broadcasting the danger warning and emergency response from the warning command control center to a plurality of remotely located home radio receivers, (g) receiving via the broadcast signals the danger warning and emergency response at the remotely located home radio receivers, and comparing at each such remotely located home radio receiver the area or earth coordinates of the dangerous situation with its own coordinates for determining the extent to which personnel near each remotely located home radio receiver is in danger, and (h) automatically issuing from each remotely located home radio receiver a warning corresponding to the extent to which the issuing remotely located home radio receiver location is in danger.

73. The method of claim 71 or 72 further comprising the step of:

programming the location coordinates of the home radio into the home radio receiver.

74. The method of claim 71 or 72 further comprising the step of:

deriving the location coordinates of the home radio from an internal GPS receiver located in the home radio.

75. The method of claim 17 or 72 further comprising the step of:

determining the coordinates of the remotely located home radio receiver using a ranging mechanism.

76. The method of claim 71 or 72 further comprising the step of:

receiving on the home radio receiver the danger warning and emergency response and annunciating from the home radio receiver an emergency message customized to the location of the home radio.

77. The method of claim 76 further comprising the step of:

identifying in the emergency message the danger and its position from the radio annunciator.

78. The method of claims 1, 63, 64, 71, or 72 further comprising the step of:

short wave transmitting codes from a remotely located warning device to the control center indicating that the select danger warning signals have been received.

79. The method of claims 1, 63, 64, 71, or 72 further comprising the steps of:

maintaining selected ones of the remotely located warning devices in a stand-by mode, and transmitting from the control center control signals to said selected ones to switch from the stand-by to a full-receive mode enabling receiving messages from the control center.

80. An automated, wide area, danger warning and emergency response system comprising:

(a) a surveillance platform located at a detection location supporting a first device for detecting a dangerous situation, (b) a first transmitter for sending information signals describing the dangerous situation from the surveillance platform via radio transmission signals to a control center for analysis, a computer system in the control center employing expert system technology for analyzing the received information signals, (d) a computer system in the control center for determining a degree of danger and its geographic extent based on the analysis of the received information signals, and for generating a danger warning and emergency response including a danger index indicating a degree of danger within at least one geographic area, (e) a second transmitter for broadcasting the danger warning and emergency response from the control center to a plurality of remotely located warning devices each of which has a GPS receiver and the ability to calculate its own location in GPS coordinates, (f) a receiver in each of the remotely located warning devices for receiving via the broadcast signals the danger warning and emergency response and for comparing in each remotely located warning device the coordinates of the dangerous situation with its own GPS coordinates for determining the extent to which each remotely located warning device is in danger, and (g) a second device coupled to each remotely located warning device for automatically issuing a warning corresponding to the extent to which the issuing remotely located warning device is in danger.

81. The system of claim 80 wherein the first detection device further comprises:

one or more surveillance apparatuses supported on one or more platforms for surveying the earth selected from the group including satellites, airborne craft, balloons or ground based unites or mobile vehicles or stationary structures.

82. The system of claim 81 wherein the surveillance apparatus further comprises:

one or more equipment or personnel supported on one or more platforms and selected from the group including video scanning cameras, infrared scanners, chemical detectors, infrared detectors or sensors, image or surveillance signal analyzers, neural networks, high speed vector processing or parallel processing systems, or human surveyors.

83. The system of claim 81 wherein the surveillance apparatus further comprises:

a GPS receiver for determining the GPS coordinates of the surveillance platform and for estimating the GPS coordinates of the detected danger when offset therefrom.

84. The system of claim 80 wherein the information signals further comprise:

GPS coordinates of the surveillance platform.

85. The system of claim 80 wherein the computer system employing expert system technology further comprises:

fuzzy logic and fuzzy inference rules.

86. The system of claim 80 wherein the expert system technology further comprises:
an expert knowledge database which employs retrieval of stored database information relating to the type of danger and the location of dangerous situations.

87. The system of claim 80 wherein the geographic extent is defined in GPS coordinates.

88. The system of claim 80 wherein the geographic extent is bounded by the radii of two circles centered on a dangerous situation whose center is defined by GPS coordinates.

89. The system of claim 88 wherein the geographic extent is bounded by angular sectors between the radii.

90. The system of claim 80 wherein the danger index is derived from one or more parameters including the distance between the dangerous situation and a particular warning device, the rate at which the dangerous situation may be approaching a particular warning device, the vulnerability of a person or property associated with a particular warning device to a particular dangerous situation, or the type of a particular dangerous situation.

91. The system of claim 80 wherein the danger warning and emergency response includes a vulnerability index for a particular area depending upon the presence of a particular structure, natural resource, or population density of the area.

92. The system of claim 80 wherein the danger warning and emergency response further comprises:
an emergency response dispatch priority based on vulnerability factors characterizing different geographic regions.

93. The system of claim 92 wherein the dispatch priority is based on a particular structure having a vulnerability to one type of a dangerous situation and people having a vulnerability to another type of dangerous situation.

94. The system of claim 80 further comprising:
a display in the control center of the results of the surveillance and analysis of signals received from the surveillance platforms to alert an operator thereof of the dangerous situation in the surveyed region.

95. The system of claim 80 further comprising,
a device for issuing warning sounds to alert an operator of the control center representative of the results of the surveillance signals received from the surveillance platform indicative of the dangerous situation in the surveyed region and the analysis thereof.

96. The system of claim 80 further comprising:
an annunciator for communicating to an operator of the control center the results of the surveillance and analysis of signals received from the surveillance platforms to alert the operator to the dangerous situation in the surveyed region.

97. The system of claim 80 wherein the second transmitter further comprises:
a transmitter for transmitting the danger warning and emergency response via a radio link to a pager satellite network and then to the warning device.

98. The system of claim 80 wherein the second transmitter further comprises:
a transmitter for transmitting the danger warning and emergency response via a radio link to a ground based pager network and then to the warning device.

99. The system of claim 80 wherein the second transmitter further comprises:
a transmitter for transmitting the danger warning and emergency response via a radio link to a ground based broadcast network and then to the warning device.

100. The system of claim 80 wherein the broadcast danger warning and emergency response further comprises:
messages containing a plurality of danger indices and geographic coordinates identifying the regions corresponding to each danger index.

101. The system of claim 100 wherein the message is presented in the form of synthetic speech.

102. The system of claim 80 wherein the broadcast danger warning and emergency response further comprises:
predefined danger emergency warning areas and a danger index for each such area relative to an identified dangerous situation.

103. The system of claim 80 wherein the second transmitter broadcast further comprises:
a transmitter for broadcasting to remote warning devices located on persons, in mobile land vehicles, in airborne craft, on vessels at sea, or in stationary structures.

104. The system of claim 80 wherein the receiver further comprises:
a comparator for comparing the GPS coordinates of the dangerous situation.

105. The system of claim 80 further comprising:
a calculator in the remotely located warning device for determining that it is located within the geographic area defined by the GPS coordinates of the dangerous situation, and, then, activating warning signals indicating the degree of danger which was communicated via the danger index in the received signals.

106. The system of claim 105 further comprising:
depending upon the location of the remotely located warning device, and different degrees of danger existing relative to the nature of the dangerous situation as indicated by the received broadcast signals, an audible, visual, vibratory or other warning device activated by the remotely located warning device for signaling the existence of a very dangerous situation if the remotely located warning device be located within a geographic area defined as having a very high danger.

107. The system of claim 105 further comprising:
depending upon the location of the remotely located warning device, and different degrees of danger existing relative to the nature of the dangerous situation as indicated by the received broadcast signals, an audible, visual vibratory or other warning device activated by the remotely located warning device for signaling the existence of a less than very dangerous situation if the warning device be located in an area adjacent to a very dangerous situation.

108. The system of claim 80 further comprising:
a remote control center for receiving the danger warning and emergency response and which dispatches and controls emergency response services to assist in alleviating the dangerous situation.

109. The system of claim 80 further comprising:
emergency services dispatched based on a priority index derived from both danger and value indices.

110. The system of claim 80 further comprising:
emergency response vehicles manned by emergency personnel located in the most dangerous areas who receive the broadcast danger warning and emergency response directly, and upon decoding the danger warning and emergency response will immediately know that they are in the proximity of the dangerous situation and may immediately respond accordingly.

111. The system of claim 110 further comprising:

the locations of the emergency response vehicles or persons being determined by using GPS technology.

112. The system of claim 80 wherein the second transmitter broadcasts the danger warning and emergency response via a conventional communication network selected from the group including television, AM/FM radio, cable, and fiber optic.

113. The system of claim 112 further comprising:

the receiver in the remotely located warning device receiving a danger index including geographic coordinates defining regions appropriate to each degree of danger corresponding to the geographic area in which the receiver is located indicating the degree of danger in which users located in particular areas may find themselves.

114. The system of claim 80 wherein the remotely located warning device is a television set further comprising:

a television receiver receiving the danger warning and emergency response and a display screen for displaying an emergency message customized to the location of the television.

115. The system of claim 114 further comprising:

the emergency message identifying the danger and its position from the television receiver based on information resulting from a comparison of electronic data from different sources occurring within the television receiver.

116. The system of claim 80 wherein the remotely located warning device is a radio set further comprising:

a radio receiver receiving the danger warning and emergency response and an annunciator for issuing from the radio an emergency message customized to the location of the radio receiver.

117. The system of claim 116 further comprising:

the emergency message identifying the danger and its position from the radio receiver based on information resulting from a comparison of electronic data from different sources occurring within the radio receiver.

118. The system of claim 80 wherein the remotely located warning device is a receiver-computer further comprising:

the receiver receiving the danger warning and emergency response and a display screen for displaying an emergency message customized to the location of the receiver-computer.

119. The system of claim 118 further comprising:

the emergency message identifying the danger and its position from the receiver-computer based on information resulting from a comparison of electronic data from different sources occurring within the receiver-computer.

120. An automated, danger warning and emergency response system for a selected area of a plurality of areas nationwide or worldwide comprising:

(a) a surveillance platform located at at least one of a plurality of detection locations supporting at least one of a plurality of first devices for detecting a dangerous situation, (b) a first transmitter for sending first information signals modulated with information relating to the dangerous situation from the surveillance platform or detection location via radio transmission signals to a warning command control center for analysis, a computer system at the warning command control center employing expert system technology for analyzing the received first information signals, (d) a computer system at the warning command control center for determining a degree of danger and its geographic extent based on the analysis of the received information signals, and for generating a danger warning and emergency response including a danger index indicating a degree of danger within at least one geographic area, (e) a transmitter for broadcasting the danger warning and emergency response from the warning command control center to a plurality of remotely located information indicating devices in an area selected relative to the geographic area having the indicated degree of danger each of which devices has a GPS receiver and the ability to calculate its own location in GPS coordinates, (f) a receiver in each of the remotely located information indicating devices for receiving via the broadcast signals the danger warning and emergency response in the remotely located information indicating devices, and comparing in each remotely located information indicating device receiver the coordinates of the dangerous situation with its own coordinates for determining the extent to which each remotely located information indicating device is in danger, (g) a second device coupled to each remotely located information indicating device receiver for automatically issuing a warning corresponding to the extent to which the issuing remotely located information indicating device is in danger.

121. The system of claim 120 wherein the information indicating device is a television set further comprising:

the location coordinates of the television being programmed into the television set receiver by a user.

122. The system of claim 120 wherein the information indicating device is a television set further comprising:

the location coordinates of the television set deriving from an internal GPS receiver-computer located in the television set.

123. The system of claim 120 wherein the information indicating device is a television set further comprising:

a ranging device for determining the coordinates of the remotely located home television.

124. The system of claim 120 wherein the information indicating device is a television set further comprising:

the television receiver receiving the danger warning and emergency response and a display screen for displaying an emergency message customized to the location of the television receiver.

125. The system of claim 124 further comprising:

the emergency message displayed identifying the danger and its position from the television set.

126. An automated, wide area, danger warning and emergency response system for multiple population areas comprising:

(a) a plurality of surveillance platforms each supporting one or more first devices for detecting a dangerous situation, (b) a first transmitter for sending information signals describing the dangerous situation from the surveillance platform via radio transmission signals to a warning command control center, a computer system at the warning command control center employing expert system technology for analyzing the received information signals, (d) a computer system at the warning command control center for determining a degree of danger and its geographic extent based on the analysis of the received information signals, and for generating a danger warning and emergency response including a danger index indicating a degree of danger within multiple areas under surveillance, (e) a radio transmitter for broadcasting the danger warning and emergency response from the warning command control center to a plurality of remotely located home radio receivers each of which has a GPS receiver and the ability to calculate its own location in GPS coordinates, (f) a radio receiver in each of the remotely located home radios for receiving via the broadcast signals the danger warning and emergency response in the remotely located home radios, and comparing in each remotely located home radio receiver the area or earth coordinates of the dangerous situation with its own coordinates for determining the extent to which each remotely located home radio receiver location is in danger, and (g) each remotely located home radio receiver having a second device coupled thereto for automatically issuing a warning corresponding to the extent to which the issuing remotely located home radio receiver location is in danger.

127. The system of claim 126 further comprising:
the location coordinates of the home radio being programmed into the home radio receiver.

128. The system of claim 126 further comprising:
the location coordinates of the home radio being derived from an internal GPS receiver located in the home radio.

129. The system of claim 126 further comprising:
a ranging device for determining the coordinates of the remotely located home radio receiver.

130. The system of claim 126 further comprising:
the radio receiver receiving the danger warning and emergency response and an annunciator for issuing from the home radio receiver an emergency message customized to the location of the home radio receiver.

131. The system of claim 130 further comprising:
the emergency message identifying the danger and its position from the home radio receiver.

132. The system of claims 80, 120, or 126 further comprising:
a short wave transmitter for transmitting codes from a remotely located warning device to the control center indicating receipt of the select danger warning signals.

133. The system of claims 80, 120, or 126 further comprising:
selected ones of the remotely located warning devices operable in a stand-by mode, and switchable to a full-receive mode for reviewing messages from the control center upon receipt of an enabling control signal from the control center.

134. A system for detecting emergency conditions and warning populations thereof comprising:
an emergency-condition monitoring station having
an earth-scanning platform operable to scan a select portion of the earth and to generate scanning signals indicative of detected emergency conditions,
computer circuitry for analyzing the scanning signals and generating warning control signals representative of the detected emergency conditions, and
a short-wave transmitter for transmitting the warning control signals at selected time intervals, and
a multitude of short-wave receivers,
each short-wave receiver being operable between a stand-by mode and a full-receive mode,
in the stand-by mode, the short wave receiver being activated at all times awaiting receipt of control signals from the monitoring station for switching the short wave receiver to the full-receive mode, and
in the full-receive mode, the short wave receiver warning members of the population by displaying intelligibly readable indications relating to the emergency conditions on a display screen coupled to the short wave receiver and by generating speech signals which are transduced into the sounds of words of speech relating to the emergency conditions by a speaker coupled to the short wave receiver.

135. The system of claim 134 wherein the earth scanning platform is an airborne satellite, aircraft, pilotless drone, or balloon, or a fixed or mobile ground-based structure or vehicle, or a person.

136. The system of claim 134 wherein the earth-scanner is an electro-optic, television camera, infrared camera, radar, or spectral scanner.

137. The system of claim 134 wherein the scanned portions of the earth include an atmosphere or an ocean.

138. The system of claim 134 wherein the scanning signals are images.

139. The system of claim 134 further comprising:
artificial intelligence ware, including fuzzy logic and neural networks, employed to detect, locate or quantify the emergency condition.

140. The system of claim 134 further comprising:
artificial intelligence ware, including fuzzy logic and neural networks, employed to determine the degree and extent of danger represented by the emergency conditions.

141. The system of claim 134 further comprising:
artificial intelligence ware, including fuzzy logic and neural networks, employed to determine the area of earth to be scanned and image analyzed.

142. The system of claim 134 further comprising:
artificial intelligence ware, including fuzzy logic and neural networks, employed to determine the population area to be warned and the information to be transmitted to the receivers of such population.

143. The system of claim 134 further comprising:
artificial intelligence ware, including fuzzy logic and neural networks, employed to determine the area of earth to have its scanning image enlarged for further analysis.

144. The system of claim 134 wherein the further analysis further comprises:
electronic scanning cameras focused on the area selected for enlargement to provide more detailed information about the emergency condition.

145. The system of claim 134 further comprising:
artificial intelligence ware, including fuzzy logic and neural networks, employed to select the type of scanning system to be employed.

146. The system of claim 134 further comprising:
artificial intelligence ware, including fuzzy logic and neural networks, employed to select and control the radiation to be used for scanning.

147. The system of claim 134 further comprising:
artificial intelligence ware, including fuzzy logic and neural networks, employed to select and control the image analyzing computing system.

148. The system of claim 134 further comprising:

artificial intelligence ware, including fuzzy logic and neural networks, employed to select and control the flight path of any airborne craft supporting one of the scanning platforms.

149. The system of claim 134 further comprising:
artificial intelligence ware, including fuzzy logic and neural networks, employed to select and control an earth satellite scanning platform.

150. The system of claim 134 wherein the short wave transmitter broadcasts on a plurality of different broadcast channels to which a plurality of different receivers are tuned.

151. The system of claim 134 wherein the short wave receiver includes a television receiver, a radio or a computer-receiver.

152. The system of claim 134 wherein the short wave transmitter is coupled to at least one communications network.

153. The system of claim 134 wherein in the full-receive mode the receiver is fully powered by line current.

154. The system of claim 134 wherein the intelligibly readable indications are lines of characters and text.

155. The system of claim 134 wherein the speech signals are synthetic.

156. The system of claim 134 wherein the warning is effected by issuing warning sounds.

157. The system of claim 134 wherein the short wave receivers are located in a select area of the earth as defined by the computer analyses of the scanning signals.

158. The system of claim 157 wherein the select area of the earth is further defined by a ground or oceanographic sensor in the area scanned.

159. The system of claim 134 further comprising:
at least some of the short-wave receivers in each population area containing an area-locating code generator and a short-wave transmitter for transmitting area-locating codes to the monitoring station, and circuitry at the monitoring station for detecting the area locating codes and those receivers in a select population area which received the warning control signals originally broadcast from the monitoring station indicative of a select emergency condition at the select population area to allow personnel at the monitoring station to analyze the situation and respond thereto accordingly.

160. The system of claim 134 further comprising:
at least some of the short-wave receivers in each population area containing an identification code generator and a short-wave transmitter for transmitting identification codes to the monitoring station, and computer circuitry at the monitoring station for detecting the identification codes and how many of those receivers in a select population area received the warning control signals originally broadcast from the monitoring station indicative of a select emergency condition at the select population area to allow a computer at the monitoring station to analyze the situation and respond thereto accordingly by retransmitting coded information.

161. The system of claim 160 wherein the retransmission includes telephoning authorities.

162. A network for detecting emergency conditions and warning populations thereof comprising:
a plurality of emergency-condition monitoring stations each having
at least one earth-scanning platform which is operable to generate scanning signals indicative of detected emergency conditions,
computer circuitry for analyzing the scanning signals and generating warning control signals representative of the detected emergency conditions, and
a short-wave transmitter for repeatably transmitting the warning control signals at selected time intervals, and
a multitude of receivers,
each receiver being operable between a stand-by mode and a full-receive mode,
in the stand-by mode, the receiver normally being activated at all times awaiting receipt of control signals from the monitoring station for switching the receiver to the full-receive mode, and
in the full-receive mode, the receiver warning members of the population by displaying intelligibly readable indications relating to the emergency conditions on a display screen coupled to the receiver and by generating speech signals which are transduced into the sounds of words of speech relating to the emergency conditions by a speaker coupled to the receiver.

163. An interactive earth scanning system for detecting variables in the planet earth comprising:
a plurality of earth-scanning platforms including satellites and pilotless aircraft operable to scan a select portion of the earth and to generate image signals thereof,
computer circuits, including artificial intelligence circuits comprising neural networks and fuzzy logic circuits, for analyzing the image signals and generating output control signals representative of the detected variables, and
a two-way communication system between the satellites and pilotless aircraft through which the output control signals from the computerized analysis of the satellite image signals are employed to further control the earth-scanning operations to optimize system detection and efficiency.

164. The system of claim 163 wherein the computer circuits for control of the earth-scanning operations further comprise circuits for controlling a flight path of one or more of the pilotless aircraft serving as a scanning platform.

165. The system of claim 163 wherein the variable of planet earth includes an emergency condition presenting a danger to population areas.

166. The system of claim 163 wherein the satellites are geo-synchronous.

167. The system of claim 163 further comprising;
each scanning platform supporting one or more tv cameras.

168. The system of claim 163 wherein the pilotless aircraft, being closer to the earth than the satellites, can provide focused enlargements of selected areas of the earth.

169. The system of claim 163 further comprising:
circuits for processing the output control signals from the computerized analysis of the satellite image signals to further control an imaging or spectral sub-system of the scanning platforms to further optimize system detection and efficiency.

170. The system of claim 163 further comprising:
circuits for processing the output control signals from the computerized analysis of the satellite image signals to further control the scanning operations of satellites and pilotless aircraft in the system.

171. The system of claim 163 further comprising:
circuits for processing the output control signals from the computerized analysis of the satellite image signals to further control data transfer between components of the system.

172. The system of claim 163 further comprising:
a ground-based monitoring station having computer circuits for employing the output signals to control the satellites and pilotless aircraft in the system.

\* \* \* \* \*